US009981520B2

(12) United States Patent  
Smith et al.

(10) Patent No.: US 9,981,520 B2
(45) Date of Patent: May 29, 2018

(54) REMOVABLE AXLE ASSEMBLY

(71) Applicant: Entro Industries, Inc., Hillsboro, OR (US)

(72) Inventors: Shawn R. Smith, Hillsboro, OR (US); Harlan B. Smith, Beaverton, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 206 days.

(21) Appl. No.: 15/045,911

(22) Filed: Feb. 17, 2016

(65) Prior Publication Data
US 2017/0232810 A1 Aug. 17, 2017

(51) Int. Cl.
*B60G 5/00* (2006.01)
*B60B 35/00* (2006.01)
*B60G 9/00* (2006.01)
*B60G 17/08* (2006.01)

(52) U.S. Cl.
CPC .............. *B60G 5/00* (2013.01); *B60B 35/006* (2013.01); *B60G 9/00* (2013.01); *B60G 17/08* (2013.01)

(58) Field of Classification Search
CPC . B62D 53/08; B60G 5/00; B60G 9/00; B60G 17/08; B60B 35/006
See application file for complete search history.

(56) References Cited

U.S. PATENT DOCUMENTS

| 3,512,597 A | 5/1970 | Baron |
| 4,058,065 A | 11/1977 | Seifert |
| 4,252,204 A | 2/1981 | Bishop |
| 6,923,278 B2 * | 8/2005 | Mulhern ............... A61G 5/043 180/209 |
| 7,497,457 B2 * | 3/2009 | Jamieson ............... B60D 1/06 280/441.2 |
| 8,215,657 B1 | 7/2012 | Gist |
| 8,646,976 B2 | 2/2014 | Stoik et al. |
| 2001/0035624 A1 * | 11/2001 | Hickling ................ B60G 9/00 280/124.169 |
| 2007/0126196 A1 * | 6/2007 | Klahn ................... B60D 1/155 280/86.5 |
| 2008/0308359 A1 * | 12/2008 | Waltz .................. B66F 9/07545 187/222 |
| 2014/0353936 A1 * | 12/2014 | Preijert .................. B60G 9/003 280/124.116 |
| 2017/0172823 A1 * | 6/2017 | Ishikawa .................. A61G 5/06 |

(Continued)

FOREIGN PATENT DOCUMENTS

EP 0000281 A1 * 1/1979 ........... B62D 21/186
WO WO-0154867 A1 * 8/2001 ............... B25G 3/26

*Primary Examiner* — Karen Beck
(74) *Attorney, Agent, or Firm* — Schwabe Williamson & Wyatt

(57) ABSTRACT

A removable axle assembly for transporting a load bearing frame includes an axle mounting structure configured to be removably attached to an axle mount. The axle mounting structure includes an inner surface that is aligned with a tapered surface of the axle mount. One or more fastening devices are attached to a clamping structure. In response to securing the one or more fastening devices, the clamping structure is configured to exert a compression force that maintains contact between the tapered surface of the frame support structure and the inner surface of the axle mounting structure.

20 Claims, 15 Drawing Sheets

(56) References Cited

U.S. PATENT DOCUMENTS

2017/0232810 A1\* 8/2017 Smith ...................... B60G 5/00
  280/124.127
2017/0232811 A1\* 8/2017 Smith ...................... B60G 9/00
  280/124.116

\* cited by examiner

REMOVABLE AXLE ASSEMBLY

TECHNICAL FIELD

This disclosure generally relates to systems, devices, apparatus, and methods associated with a removable axle assembly for a load transporting system.

BACKGROUND

Moving extremely heavy loads has generally been a complicated task because of the large forces involved in lifting and transporting the heavy loads. In known mounting structures, large loads may be transported by disassembling or breaking up the load or the mounting structure into multiple smaller sections and/or loads. However, this breakdown and subsequent reassembly process can be very time consuming, especially when a heavy load is only to be moved a small distance, or needs to be repositioned.

For heavy loads that need periodic movement or adjustment, devices commonly referred to as "walking machines" or "walkers" were developed. These machines may be configured to move the heavy loads over small distances in incremental stages. For example, walking machines may be used to move large structures, such as oil rigs, in order to position them over pre-drilled pipes in oil fields.

In other types of systems, heavy duty axle assemblies have been developed to transport and/or support heavy loads. The axle assemblies may include hydraulic lift functionality, such as a hydraulic cylinder that is typically welded directly to the axle assembly to provide a rigid connection that can withstand the resulting stress from carrying the heavy load.

Locations where oil rigs operate may provide for extreme temperature variations, humidity, dust and/or other particulates, and other environmental conditions that, in addition to the wear and tear that results from moving the heavy loads, may result in frequent maintenance or repair of the load transport systems. For example, it is not uncommon for a lift cylinder or cylinder rod to fail and need to be replaced and/or serviced while a transportable oil rig is at the work site.

In situations where the lift cylinder rod fails, the lift cylinder rod together with the axle assembly is typically removed from operation and replaced with an entirely different assembly. This, of course, requires the operator of the oil rig to have a spare axle assembly on hand, and typically the old axle assembly would be transported to a repair facility so that the hydraulic cylinder can be removed from the axle assembly and be repaired. Even in situations where on-site maintenance of the lift cylinder rod may be performed, e.g., by torch cutting the weldment, the physical removal of the lift cylinder rod from the axle assembly may result in a material weakening of the metal plates or other components of the weldment, which may lead to further failures of the axle assembly or components thereof.

The present invention addresses these and other problems.

SUMMARY

A removable axle assembly is disclosed herein, as comprising a removable axle assembly for transporting a load bearing frame. An axle mounting structure may be configured to be removably attached to an axle mount. The axle mounting structure may include an inner surface that aligns with a tapered surface of the axle mount. One or more fastening devices may be attached to a clamping structure. In response to securing the one or more fastening devices, the clamping structure may be configured to exert a compression force that maintains contact between the tapered surface of the frame support structure and the inner surface of the axle mounting structure.

A removable axle assembly is disclosed herein, as comprising an axle and an axle mounting structure operably coupled to the axle. The axle mounting structure may be configured to be removably attached to an axle mount, and the axle mounting structure may comprise an inner surface that aligns with a non-vertical tapered surface of the axle mount. The axle assembly may additionally comprise means for securing the tapered surface of the axle mount to the inner surface of the axle mounting structure, and means for exerting a compression force to maintain contact between the tapered surface of the axle mount and the inner surface of the axle mounting structure.

A method for removably attaching an axle assembly is disclosed herein. The method may comprise positioning a lower end of the axle mount within an axle mounting structure. The axle mounting structure may comprise an inner surface that aligns with a tapered surface of the axle mount. Additionally, one or more fastening devices may be attached to a clamping structure. The clamping structure may exert a compression force that maintains contact between the tapered surface of the axle mount and the inner surface of the axle mounting structure. The compression force may result from securing the one or more fastening devices.

An axle assembly is disclosed herein. The axle assembly may comprise an axle and an axle mount frame configured to be attached to the axle. A positional locater may project from an outer surface of the axle to locate an initial position of the axle relative to the axle mount. Additionally, an axle adjustment device may comprise an inclined surface that contacts the positional locater, and a compressive force may be exerted between the axle mount and the axle adjustment device when the axle adjustment device is placed in contact with the positional locater to maintain the initial position of the axle.

An axle assembly is disclosed herein, as comprising an axle comprising a tapered surface and a non-horizontal bearing surface. An axle mount may be operably coupled to the axle, and the axle mount may comprise a contact surface that is aligned with the bearing surface of the axle. An axle adjustment device may comprise an inclined surface that contacts the tapered surface of the axle. Additionally, the axle assembly may comprise means for coupling the axle adjustment device to the axle mount to longitudinally position the axle mount relative to the axle, and means for exerting a compression force between the contact surface of the axle mount and the bearing surface of the axle.

A method for removably attaching an axle assembly to an axle mount is disclosed herein. The method may comprise locating a positional axle mounting structure at a first positional locater that projects from an outer surface of the axle, and locating an additional axle mounting structure at a second positional locater that projects from the outer surface of the axle. An adjustment device may be positioned between the positional axle mounting structure and the axle mount, and the adjustment device may be attached to the axle mount.

DETAILED DESCRIPTION

A support structure for carrying a heavy load, such as an oil rig, may comprise one or more load transporting apparatus or systems that are used for transporting the support structure. Such loads may be as heavy as several thousand tons and may be sequentially positioned very precisely over spaced-apart well bores, for example. The load transporting apparatuses or systems may include one or more axle assemblies.

Figure 1:
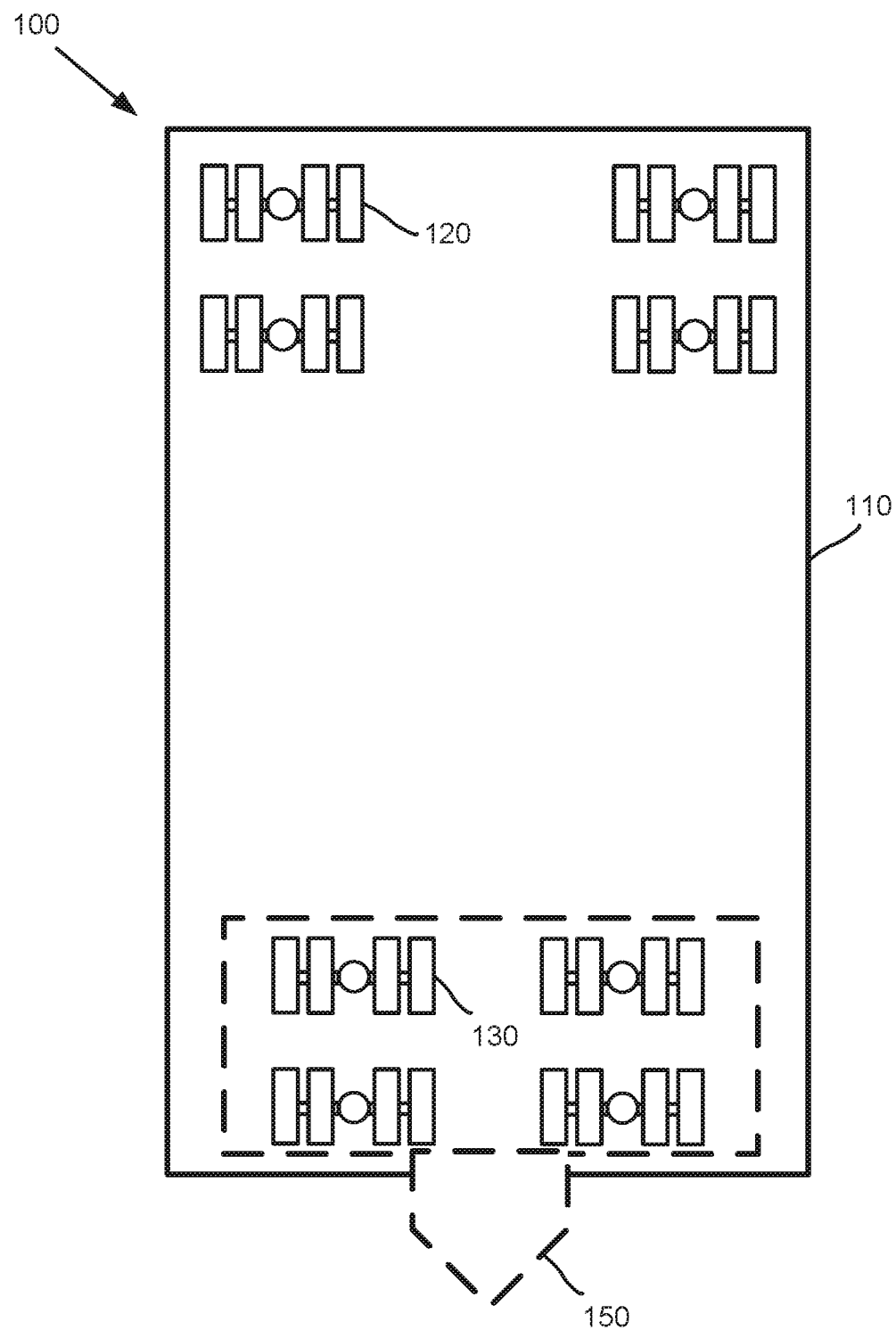
FIG. 1 illustrates a planar view of an example transportable mounting structure.

FIG. 1 illustrates a planar view of an example transportable mounting structure 100. The mounting structure 100 may comprise a platform 110 or heavy duty trailer, for example. A plurality of load transport apparatus, such as first load transport apparatus 120, may be connected to the platform 110 at one or both ends. For example, first load transport apparatus 120 may be connected at a front end of platform 110 and a second load transport apparatus 130 may be connected at a rear end of platform 110. Additional load transport structures may be connected at the corresponding left and right sides of either end. Depending on the size of mounting structure 100 and/or the weight of the load being transported on platform 110, additional load transport devices may be connected at one or more positions along the length and/or width of mounting structure.

First load transport apparatus 120 may be rigidly and/or directly attached to platform 110 as a stand-alone assembly. In some examples, second load transport apparatus 130 may be connected to platform 110 via a trailer assembly 150 (shown in dashed lines) comprising a plurality of load transport apparatus. In some examples, trailer assembly 150 may comprise a load dividing trailer, a "jeep" trailer, other types of trailers, or any combination thereof.

Trailer assembly 150 may be configured to mount to a tow vehicle (not shown) and in some examples, the entire trailer assembly 150 may be configured to pivot or turn with respect to platform 110 during transport of and/or maneuvering mounting structure 100. One or both of first load transport apparatus 120 and second load transport apparatus 130 may comprise an axle assembly and/or a lift device.

Figure 2:
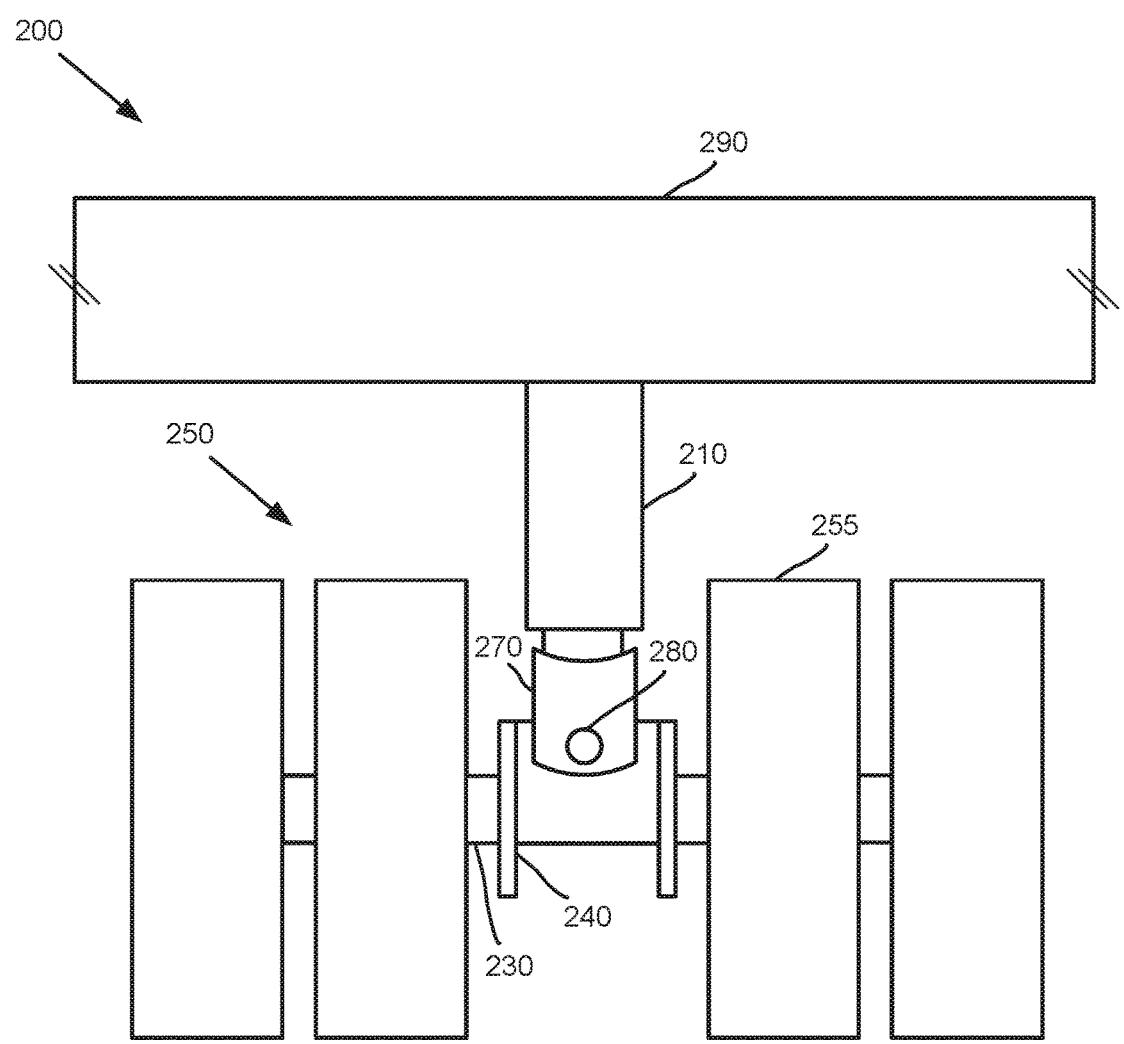
FIG. 2 illustrates a front view of an example load transport apparatus comprising a removable axle assembly.

FIG. 2 illustrates a front view of an example load transport apparatus 200 comprising a removable axle assembly 250. A lift apparatus 210 may be coupled to a load bearing support structure 290. Axle assembly 250 may be operably coupled to lift apparatus 210 by coupling apparatus 270.

Lift apparatus 210 may additionally be operably coupled to axle assembly 250 via coupling apparatus 270 and/or by an axle mount frame 240. Axle assembly 250 may comprise an axle 230 that passes through and/or is rotationally coupled to axle mount frame 240. Four wheels 255 are shown as being connected to axle 230, although more or fewer wheels associated with axle assembly 250 are contemplated herein.

In some examples, axle assembly 250 may be configured to rotate or articulate about an articulating connection 280 of coupling apparatus 270. Articulating connection 280 may provide for the articulation of axle assembly 250 about an axis of rotation which is substantially perpendicular to the axis of rotation of axle 230.

Figure 3:
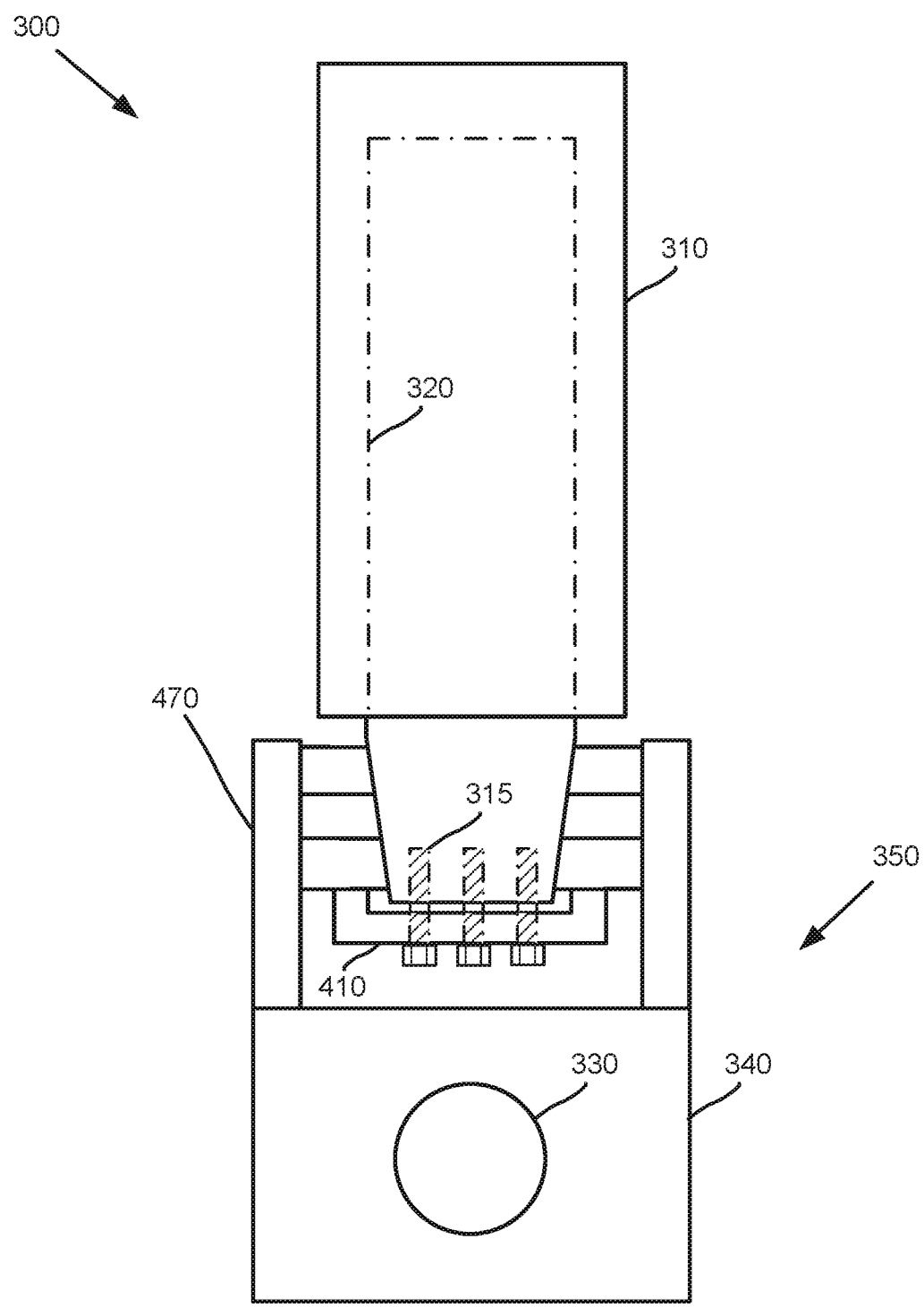
FIG. 3 illustrates a side view of an example load transport apparatus comprising an axle assembly removably attached to a lift apparatus.

FIG. 3 illustrates a partial cross-sectional side view of an example load transport apparatus 300 comprising an axle assembly 350 removably attached to a lift apparatus 310. Lift apparatus 310 may comprise a lift cylinder and a lift cylinder rod 320 (partially shown in dashed lines) operably coupled to axle assembly 350 by a coupling apparatus 470. Lift cylinder rod 320 may comprise and/or be attached to a piston. In some examples, coupling apparatus 470 may be configured similarly as coupling apparatus 270 of FIG. 2. Additionally, axle assembly 350 may comprise an axle 330 and an axle mount frame 340, similar to axle 230 and axle mount frame 240 of FIG. 2.

Coupling apparatus 470 may comprise one or more fasteners 315, such as a bolt, a clamp, a nut, a screw fitting, a pin, a clip, other types of fastening and/or attachment devices, or any combination thereof. Additionally, fasteners 315 may be configured to rigidly fasten the lower end of lift cylinder rod 320 to coupling apparatus 470. For example, coupling apparatus 470 may comprise a clamping plate 410 that is configured to draw lift cylinder rod 320 into direct contact with coupling apparatus 470 as fasteners 315 are tightened and/or otherwise secured. Fasteners 315 are illustrated as passing through clamping plate 410 and into the lower end of lift cylinder rod 320.

Figure 4A:
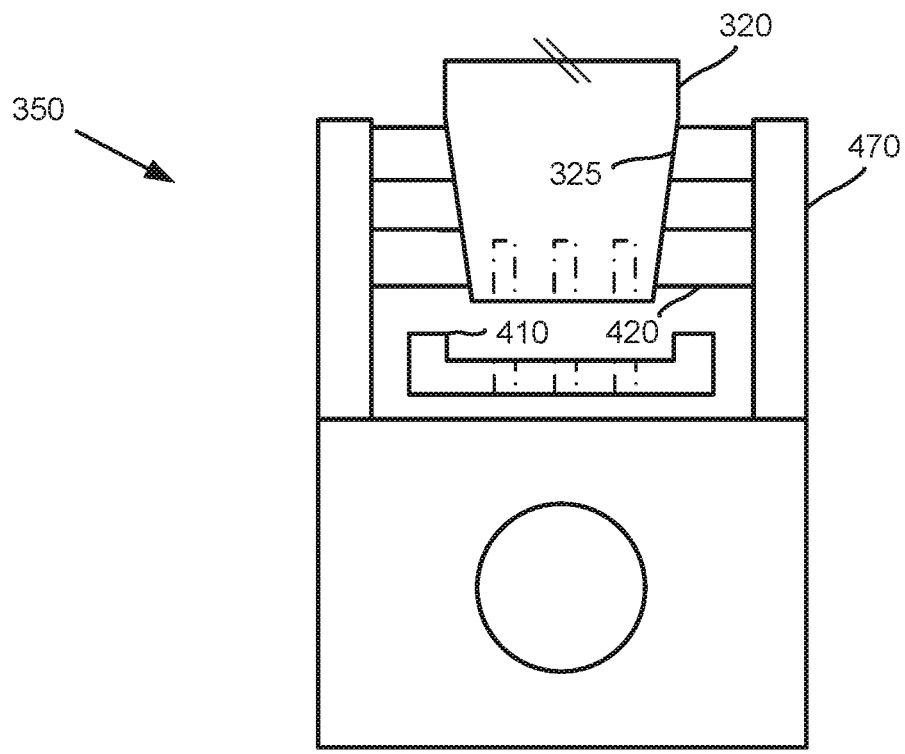
FIG. 4A illustrates the example axle assembly of FIG. 3 partially disconnected from the lift apparatus.

FIG. 4A illustrates the example axle assembly 350 of FIG. 3 partially disconnected from the lift apparatus. Clamping plate 410 is shown having been disconnected from the lower end of lift cylinder rod 320 following the removal of fasteners 315 (FIG. 3), such that the upper surface of clamping plate 410 is no longer in contact with the lower surface of one or more mounting structures 420 of coupling apparatus 470. The one or more mounting structures 420 may be configured to provide a fitted seat or receptacle for the lower end of lift cylinder rod 320.

Lift cylinder rod 320 may be configured with a tapered or angled surface 325 which narrows to a smaller diameter lower end that attaches to clamping plate 410 via fasteners 315 (FIG. 3). The lower portion of lift cylinder rod 320 may comprise a partial cone-shaped exterior surface. The one or more mounting structures 420 may similarly include a tapered or angled surface that align or mate with the tapered surface 325 of lift cylinder rod 320. The one or more mounting structures 420 may be configured as a ring that encircles the circumference of lift cylinder rod 320.

Coupling apparatus 470 may comprise two mounting rings that are configured to contact support lift cylinder rod 320 at two different elevations along tapered surface 325. By securing and/or tightening clamping plate 410 to the lower surface of the one or more mounting structures 420, the tapered surface 325 of lift cylinder rod 320 may be pressed against and/or firmly secured against the corresponding angled surface(s) of the one or more mounting structures 420.

Figure 4B:
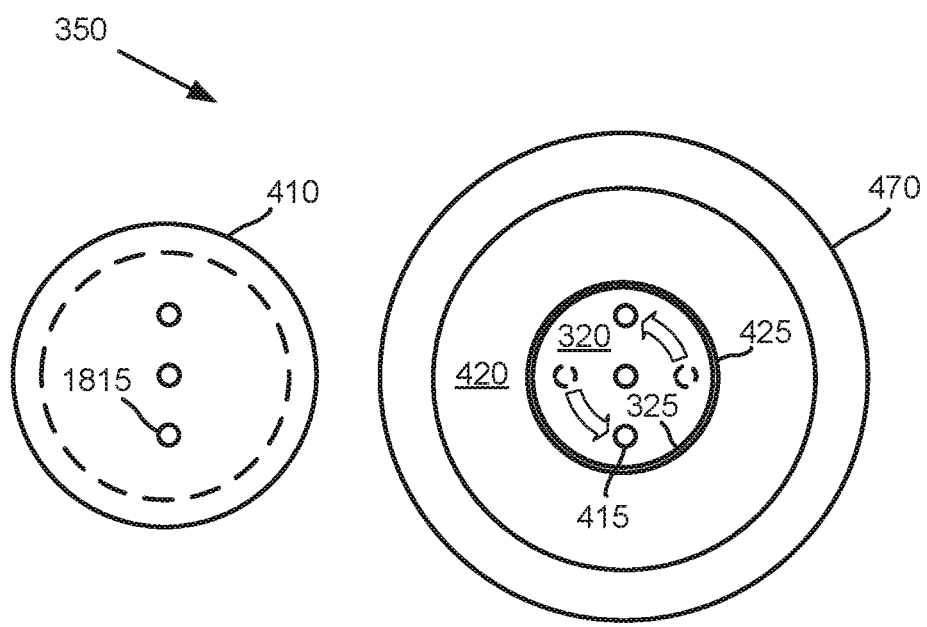
FIG. 4B illustrates a bottom plan view of the example axle assembly of FIG. 4A partially disconnected.

FIG. 4B illustrates a bottom plan view of the example axle assembly 350 of FIG. 4A partially disconnected from the lift cylinder rod 320 or other type of axle mount. Axle mount frame 340 is omitted from the bottom plan view for clarity. Clamping plate 410 is shown having been disconnected from the lower end of lift cylinder rod 320 following the removal of fasteners 315 (FIG. 3) from mounting holes 415.

With axle assembly 350 and coupling apparatus 470 partially disconnected from lift cylinder rod 320, the tapered surface 325 of lift cylinder rod 320 may rotate relative to the angled surface 425 of mounting structure 420. In practice, the axle assembly 350 including mounting structure 420 and coupling apparatus 470 may rotate with respect to lift cylinder rod 320, however for purposes of illustration lift cylinder rod 320 is shown in a rotated position to illustrate the relative change in position of mounting holes 415 with respect to mounting structure 420. In some examples, axle assembly 350 may be rotated ninety degrees with respect to the lift cylinder rod 320, such that mounting holes 415 will also be placed at a ninety degree angle of rotation with respect to mounting structure 420.

Clamping plate 410 may be positioned relative to lift cylinder rod 320 such that mounting holes 815 associated with clamping plate 410 align with mounting holes 415 when axle assembly 350 is reattached to lift cylinder rod 320 in the rotated position. Mounting holes 415, 815 are each shown as including three holes, however other numbers of holes may similarly be used to removably attach axle assembly 350 to lift cylinder rod 320.

Figure 5:
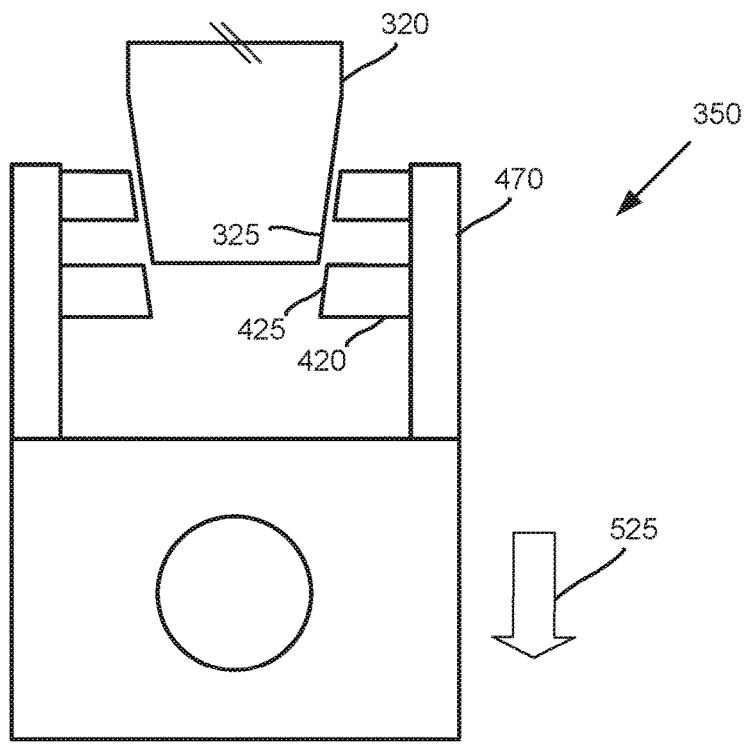
FIG. 5 illustrates the example axle assembly of FIG. 3 in the process of being separated from the lift apparatus.

FIG. 5 illustrates the example axle assembly 350 of FIG. 3 in the process of being separated from the lift apparatus. In the illustrated example, axle assembly 350 is shown being moved away from lift cylinder rod 320 in the generally downward direction shown by arrow 525, such that tapered surface 325 is no longer in contact with a corresponding angled surface 425 of the one or more mounting structures 420. The tapered surface 325 of lift cylinder rod 320 is configured to facilitate the insertion and/or removal of lift cylinder rod 320 from coupling apparatus 470. For example, the tapered surface 325 prevents lift cylinder rod 320 from becoming unintentionally wedged within the one or more mounting structures 420, and that otherwise might make withdrawal of lift cylinder rod 320 difficult and/or require excessive force for removal which might damage one or more components.

Although arrow 525 indicates a relative downward movement of axle assembly 350 with respect to lift cylinder rod 320, in some examples it may be more convenient to raise the lift cylinder rod 320 and/or entire lift apparatus up and out of coupling apparatus 470, while the wheels associated with axle assembly 350 are resting on the ground or other support surface. In still other examples, axle assembly 350 may be moved in a lateral direction, or sideways, from lift cylinder rod 320 after being disconnected.

Figure 6:
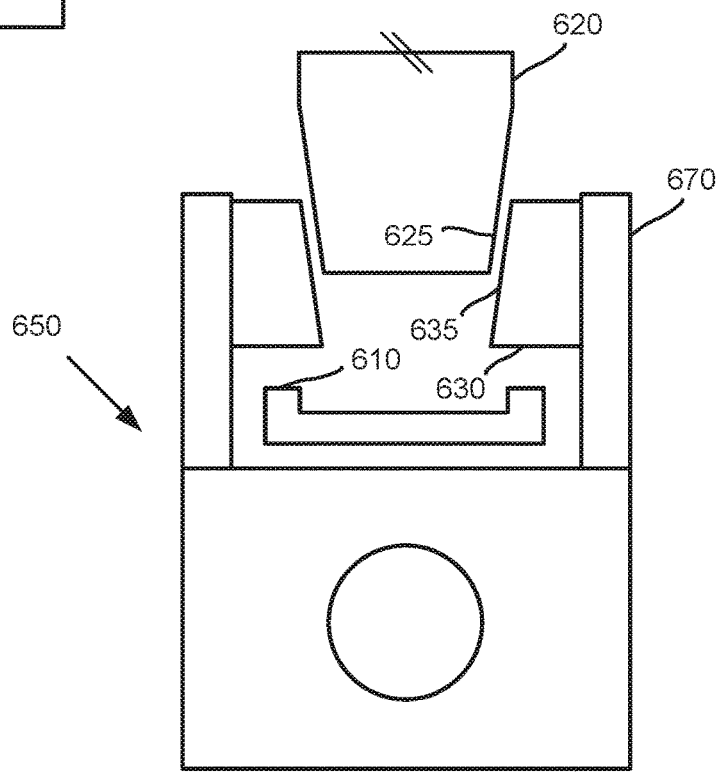
FIG. 6 illustrates an example load transport system comprising a removable axle assembly.

FIG. 6 illustrates an example load transport system comprising a removable axle assembly 650 shown in a partially exploded view. Axle assembly 650 may be removably coupled to an axle mount 620. The axle mount 620 may be connected to a load bearing frame or platform, such as load bearing support structure 290 and/or platform 110 (FIG. 1). Axle mount 620 may comprise a tapered lower end, illustrated as tapered surface 625, which gradually decreases in diameter as compared to the main or upper body of the axle mount 620.

In some examples, axle mount 620 may comprise one or more beams, pillars, shafts, struts, linkage, other types of mounting and/or support structures, such as an "A-arm" used in the automotive industry, or any combination thereof. In still other examples, axle mount 620 may comprise a hydraulic lift cylinder rod and/or piston, similar to cylinder rod 320 of the lift apparatus 310 (FIG. 3).

Axle assembly 650 may comprise a coupling apparatus 670 including an axle mounting structure 630. Axle mounting structure 630 may comprise an angled surface 635 approximately aligned with the tapered surface 625 associated with axle mount 620. Axle assembly 650 may be removably coupled to axle mount 620 such that the tapered surface 635 of axle mounting structure 630 comes into contact with the angled surface 635 of axle mount 620. Axle mounting structure 630 may comprise a disc, a ring, or a plate that is configured to essentially surround the axle mount 620 about the circumference of tapered surface 625. Angled surface 635 may be formed on a through-hole of axle mounting structure 630.

In some examples, substantially the entire angled surface 635 of axle mounting structure 630 may come into direct contact with the tapered surface 625 of axle mount 620. In other examples, a majority of the angled surface 635 of axle mounting structure 630 may come into direct contact with the tapered surface 625 of axle mount 620.

A clamping plate 610 may be used to secure axle mounting structure 630 to axle mount 620. Clamping plate 610 may be configured similarly as clamping plate 410 (FIG. 3). For example, one or more fastening devices may be configured to secure and/or tighten clamping plate 610 to axle mounting structure 630 and/or to axle mount 620.

Figure 7:
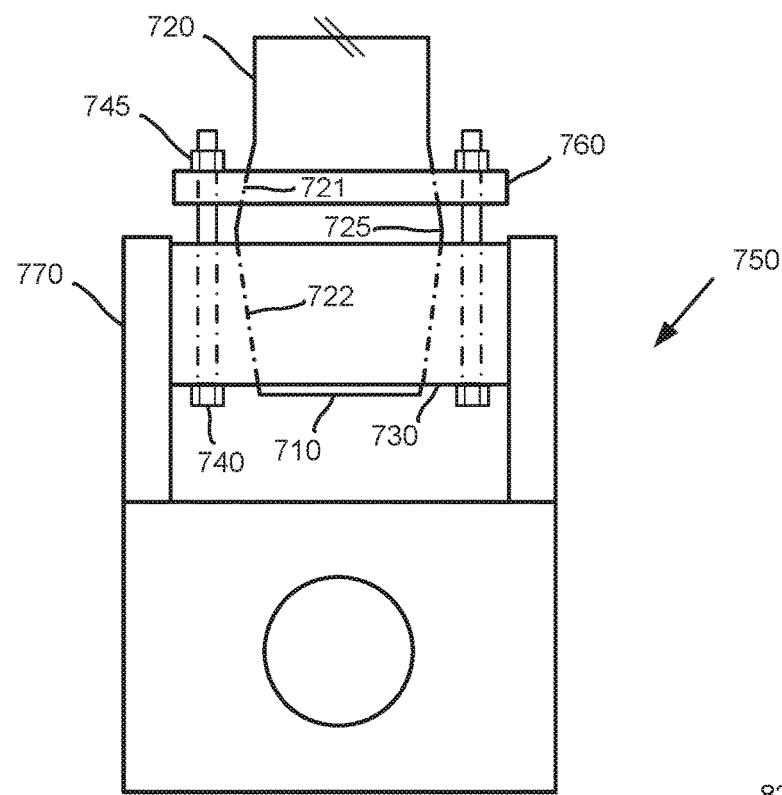
FIG. 7 illustrates another example load transport system comprising a removable axle assembly.

FIG. 7 illustrates another example load transport system comprising a removable axle assembly 750. An axle mount 720 may be connected to a load bearing frame or platform, and additionally may comprise two tapered surfaces, illustrated as a first tapered surface 721 and a second tapered surface 722. First tapered surface 721 may gradually increase in diameter from the main or upper body of axle mount 720 to a raised portion 725. Second tapered surface 722 may gradually decrease in diameter from the raised portion 725 towards the lower end 710 of axle mount 720. In some example, raised portion 725 may form a ridge and/or be associated with a maximum diameter of axle mount 720.

First tapered surface 721 may be configured to contact a clamping device 760. Clamping device 760 may be configured as a disc, a ring, a washer, or a plate which at least partially surrounds axle mount 720. Additionally, one or more fasteners 740, such as a bolt, a clamp, a nut, a screw fitting, a pin, a clip, other types of fastening and/or attachment devices, or any combination thereof, may be configured to rigidly fasten axle mount 720 to a coupling apparatus 770. For example, clamping device 760 may be configured to draw axle mount 720 into direct contact with an axle mounting structure 730 associated with coupling apparatus 770, as fasteners 740 are tightened and/or otherwise secured.

Second tapered surface 722 may be configured similarly as the one or more mounting structures 420 (FIG. 4), in that the second tapered surface 722 of axle mount 720 may be configured to contact a correspondingly angled surface of an axle mounting structure 730 associated with coupling apparatus 770.

Fasteners 740 are illustrated as passing through or into both clamping device 760 and axle mounting structure 730. One or more nuts 745 or other types of tensioning devices may be configured to adjust the tension provided by fasteners 740 as the nuts 745 are tightened or loosened. Fasteners 740 may be configured to provide a compression force on the lower end of axle mount 720 between axle mounting structure 730 and clamping device 760. In some examples, axle mount 720 may comprise a load support frame, a lift cylinder, an axle linkage, other types of support structures, or any combination thereof.

Figure 8:
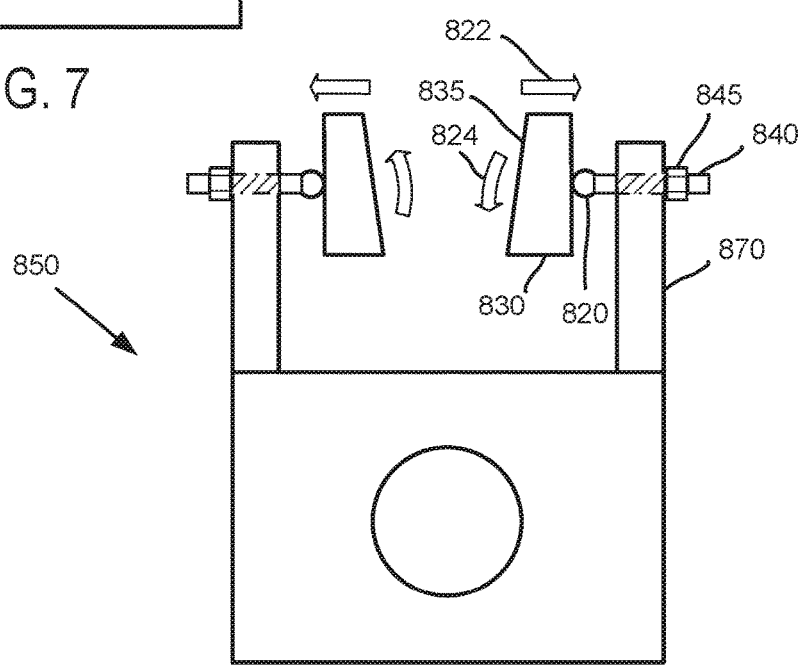
FIG. 8 illustrates yet a further example load transport system comprising a removable axle assembly.

FIG. 8 illustrates yet a further example load transport system comprising a removable axle assembly 850. Axle assembly 850 may be removably coupled to an axle mount, similar to axle mount 620 (FIG. 6), and/or to a lift apparatus, such as lift cylinder rod 320 (FIG. 3).

Axle assembly 850 may comprise a coupling system 870 including a plurality of mounting structures 830. The plurality of mounting structures 830 may comprise an angled surface 835. Additionally, coupling system 870 may comprise an adjustment device 840 configured to vary the position of the plurality of mounting structures 830 and/or to vary the angled surface 835.

In some examples adjustment device 840 may be moved laterally through a support plate of coupling system 870 to effectuate a corresponding lateral movement of one or more of the plurality of mounting structures 830 in the lateral direction 822. For example, the plurality of mounting structures 830 may be moved outward to accommodate a larger diameter axle mount and/or a larger diameter lift cylinder rod. Alternatively, the plurality of mounting structures 830 may be moved inward to accommodate a smaller diameter axle mount and/or a smaller diameter lift cylinder rod. A bolt 845 or other type of securing device may be configured to retain the position of the plurality of mounting structures 830 at a fixed distance from each other.

The plurality of mounting structures 830 may be rotated 824 about a pivot 820 attached at an end of adjustment device 840 to vary one or more angles associated with angled surface 835. For example, the plurality of mounting structures 830 may be rotated downward to accommodate an axle mount and/or a lift cylinder rod having a tapered surface which only slightly deviates from vertical. Alternatively, the plurality of mounting structures 830 may be rotated upward to accommodate an axle mount and/or a lift cylinder rod having a tapered surface which deviates more substantially from vertical.

The position of the one or more mounting structures 830 may be adjusted so that a majority or substantially the entire angled surface 835 of the plurality of mounting structures 830 may come into direct contact with the tapered surface of a variety of different axle mounts and/or lift cylinder rods of varying sizes, diameters, or tapered angles.

In some examples, coupling system 870 may comprise and/or be configured to operate with a clamping device, such as clamping plate 410 (FIG. 3) or clamping device 760 (FIG. 7), and additionally, one or fastening devices such as fasteners 315 (FIG. 3) or fasteners 740 (FIG. 7).

Figure 9:
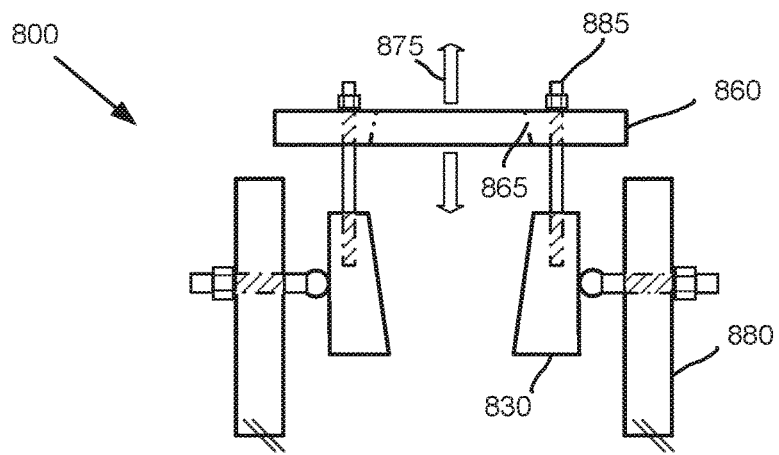
FIG. 9 illustrates an example variation of the load transport system of FIG. 8.

FIG. 9 illustrates an example variation 800 of the load transport system of FIG. 8. In this example, an upper clamping device 860 may be configured to work in conjunction with the adjustable position mounting structures 830 operably coupled to a support plate 880. Upper clamping device 860 may be coupled to mounting structures 830 by a number of upper fasteners 885. Upper fasteners 885 may be configured to adjust the position of upper clamping device 860 in the vertical direction 875. For example, the distance between upper clamping device 860 and the mounting structures may be varied by moving upper clamping device 860 either up or down.

Upper clamping device 860 may comprise a disc or plate that is configured to essentially surround an axle mount and/or lift cylinder rod about its diameter. Additionally, upper clamping device 860 may comprise a through-hole 865 with tapered walls.

Figure 10:
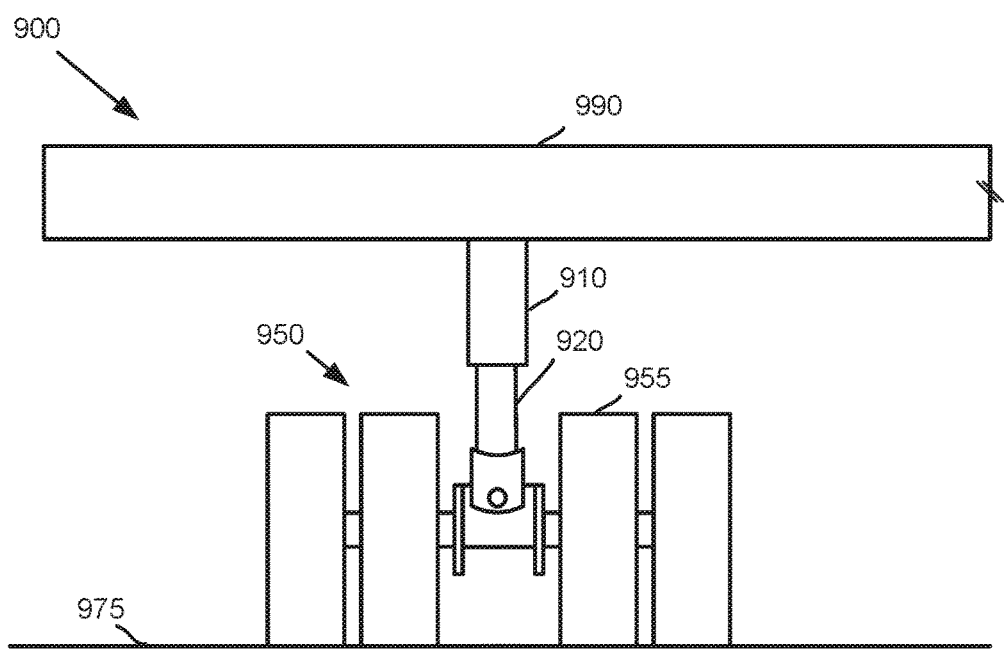
FIG. 10 illustrates an example load transport system in an elevated position.

FIG. 10 illustrates an example load transport system 900 in an elevated position. In the elevated position, a lift device 910 may be configured to extend a lift cylinder rod 920 such that a load bearing frame or platform 990 may be raised while the wheels 955 of an axle assembly 950 are located on the ground 975. In some examples, axel assembly 950 may be configured similarly as axle assembly 250 (FIG. 2).

Figure 11A:
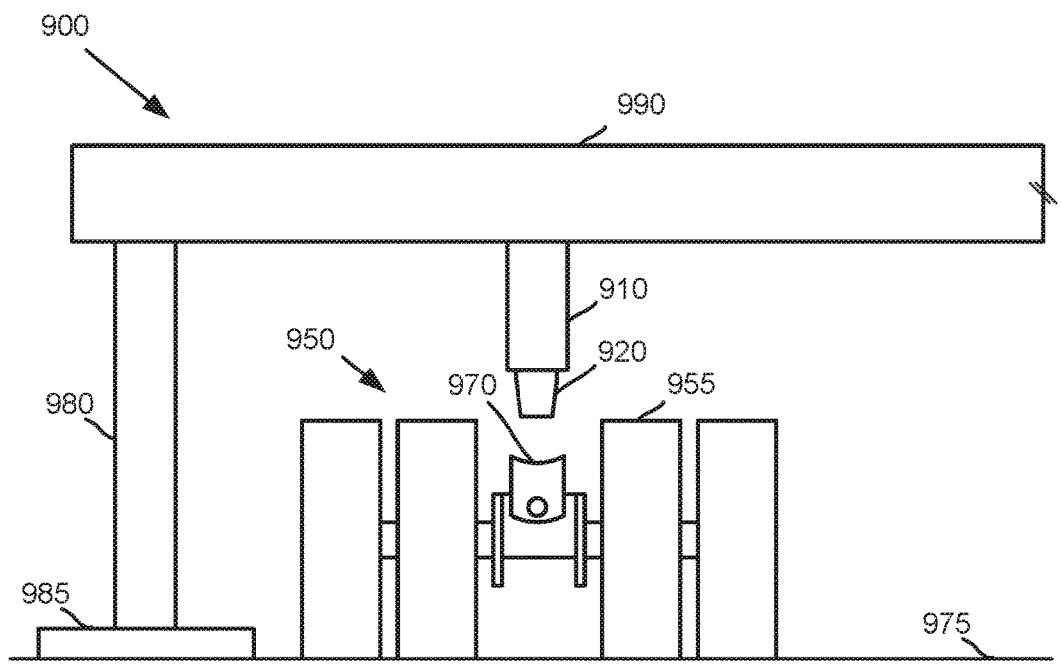
FIG. 11A illustrates the example load transport system of FIG. 10 with a disconnected axle assembly.

FIG. 11A illustrates the example load transport system 900 of FIG. 10 with a disconnected axle assembly 950. Lift cylinder rod 920 may be disconnected from a coupling system 970 prior to withdrawing lift cylinder rod 920 into a lift cylinder of the lift device 910. In some examples, coupling system 970 may be configured similarly to one or more of the coupling systems illustrated and described at FIGS. 2-9.

Prior to disconnecting lift cylinder rod 920 from coupling system 970, one or more support struts 980 may be configured to support the weight of platform 990. Support strut 980 may comprise a base foot 985 that contacts the ground 975 or other support surface. With the one or more support struts 980 in place, lift cylinder rod 920 may be disconnected from coupling system 970 while maintaining platform 990 in the same elevated position with respect to the ground 975. Once lift cylinder rod 920 has been disconnected, axle assembly 950 may be moved out from under one or both of lift device 910 and platform 990.

Removal of axle assembly 950 may facilitate access to lift device 910 for purposes of repair, maintenance, or replacement. In some examples, the same axle assembly 950 may be reconnected to a repaired or replaced lift device.

Figure 11B:
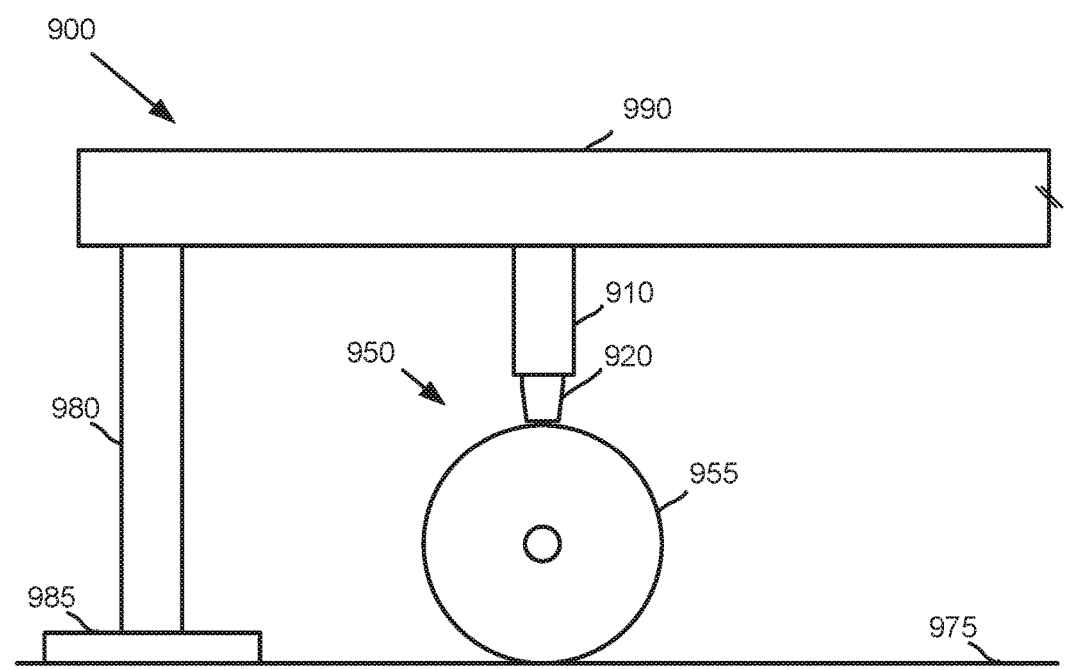
FIG. 11B illustrates the example load transport system of FIG. 11A with the disconnected axle assembly rotated ninety degrees.

FIG. 11B illustrates the example load transport system 900 of FIG. 11A with the disconnected axle assembly 950 rotated ninety degrees with respect to platform 990. In some examples, one or both of axle assembly 950 and lift cylinder rod 920 may be configured similarly as axle assembly 350 and lift cylinder rod 320 illustrated in FIG. 18. With axle assembly 950 rotated ninety degrees and reattached to lift apparatus 910, the wheels 955 may be configured to allow load transport system 900 to be moved in a perpendicular direction as compared to the assembled load transport system 900 illustrated in FIG. 10.

Support strut 980 may be configured to support the weight of platform 990 on base foot 985 to facilitate the rotation of axle assembly 950 with respect to lift cylinder rod 920. Once lift cylinder rod 920 has been reattached to the rotated axle assembly 950, support strut 980 may be removed out from under platform 990 or retracted.

Figure 12:
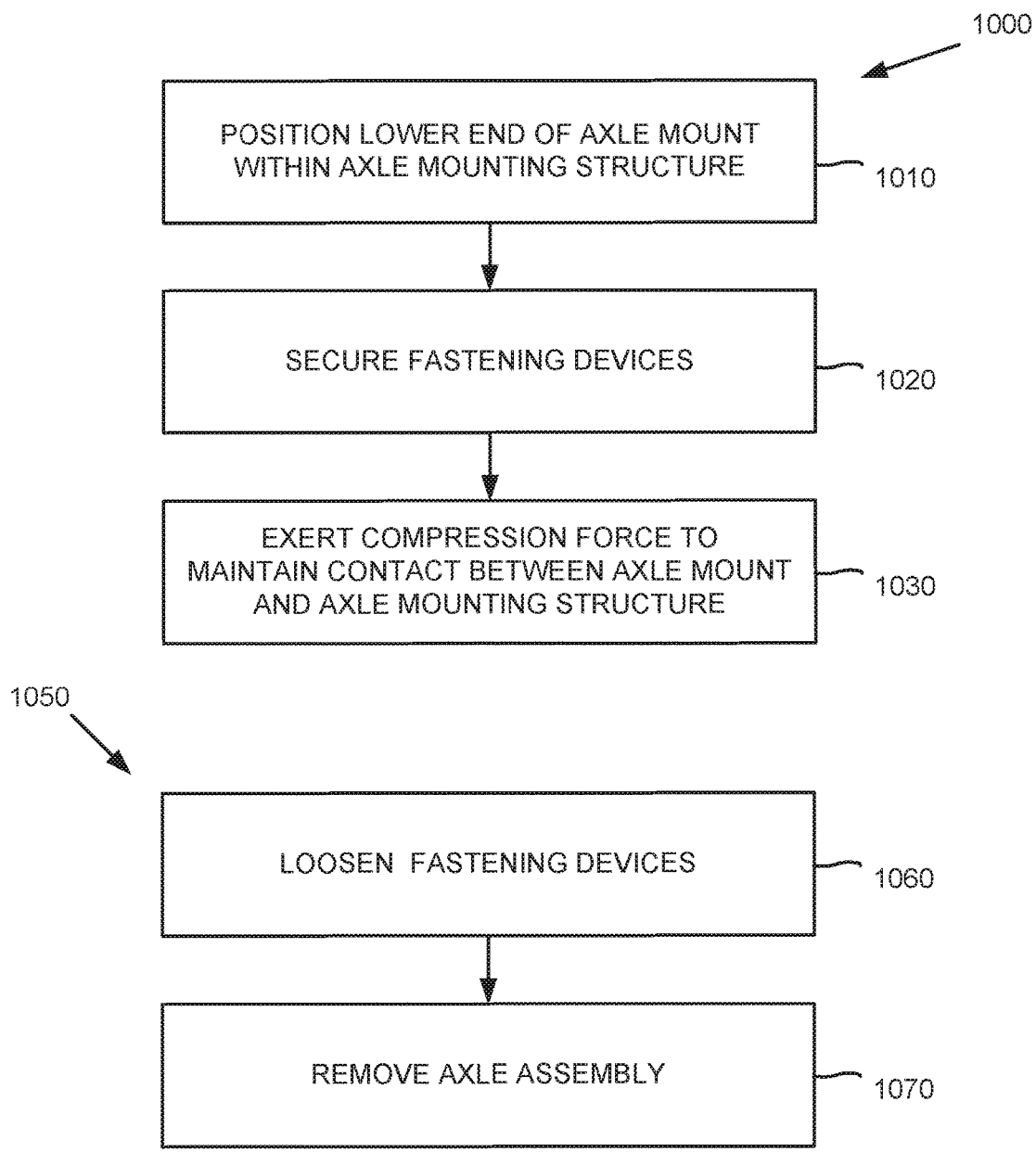
FIG. 12 illustrates an example process associated with removably attaching an axle assembly to an axle mount and an example process for removing the axle assembly.

FIG. 12 illustrates an example process 1000 associated with removably attaching an axle assembly to an axle mount and an example process 1050 for removing the axle assembly. At operation 1010, a lower end of the axle mount may be positioned within an axle mounting structure. The axle mounting structure may comprise an inner surface aligned with a non-vertical tapered surface of the axle mount.

At operation 1020, the process may comprise securing one or more fastening devices attached to a clamping structure. In some examples, the axle mount may comprise a cylinder rod associated with a hydraulic lift cylinder, and the clamping structure may be positioned beneath the cylinder rod. Securing the one or more fastening devices may comprise mounting a plurality of bolts to a bottom surface of the cylinder rod. The plurality of bolts may pass through the clamping structure and into the bottom surface of the cylinder rod.

At operation 1030, a compression force may be exerted, such as by the clamping structure, to maintain contact between the tapered surface of the axle mount and the inner surface of the axle mounting structure. The compression force may result from securing the one or more fastening devices. In some examples, the clamping structure may comprise a plate located above the axle mounting structure, and a through-hole of the plate may be configured to provide a seat for the axle mount. Securing the one or more fastening devices may comprise coupling the plate to the axle mounting structure with a plurality of bolts.

At operation 1060 of removal process 1050, the fastening devices may be loosened and/or detached. For example, one or more bolts may be unscrewed from the clamping structure and/or from the bottom surface of a cylinder rod. Loosening the fastening devices may result in the removal of the compression force that otherwise maintained contact between the tapered surface of the axle mount and the inner surface of the axle mounting structure.

At operation 1070, with the fastening devices having been loosened, the axle assembly may be removed from the axle mount.

Figure 13:
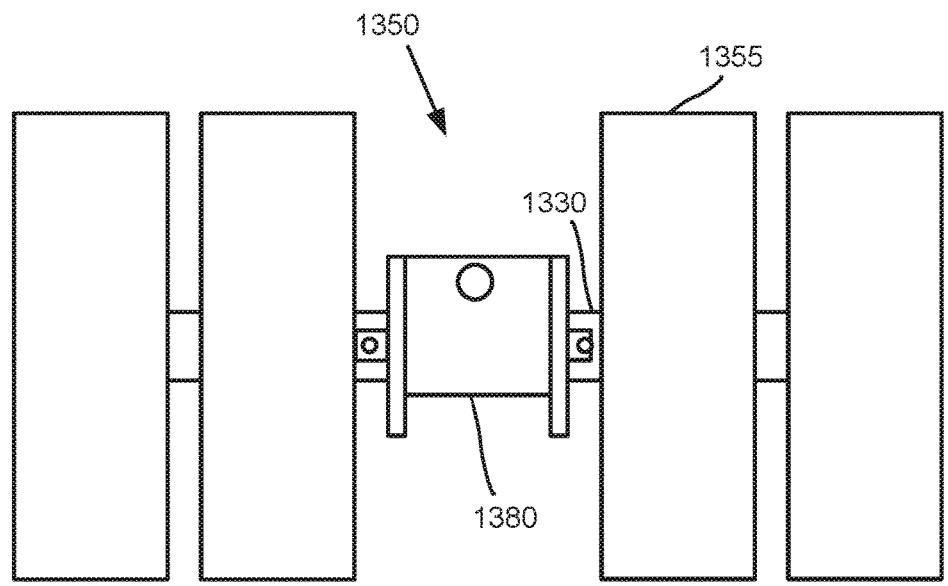
FIG. 13 illustrates a front view of an example axle assembly comprising an axle attached to an axle mount.

FIG. 13 illustrates a front view of an example axle assembly 1350 comprising an axle 1330 attached to an axle mount frame 1380. In some examples, the axle mount frame 1380 may be connected to a load bearing frame or platform, such as load bearing support structure 290 (FIG. 2) and/or platform 110 (FIG. 1). The axle assembly 1350 may comprise a number of wheels 1355 rotationally mounted on axle 1330.

Figure 14:
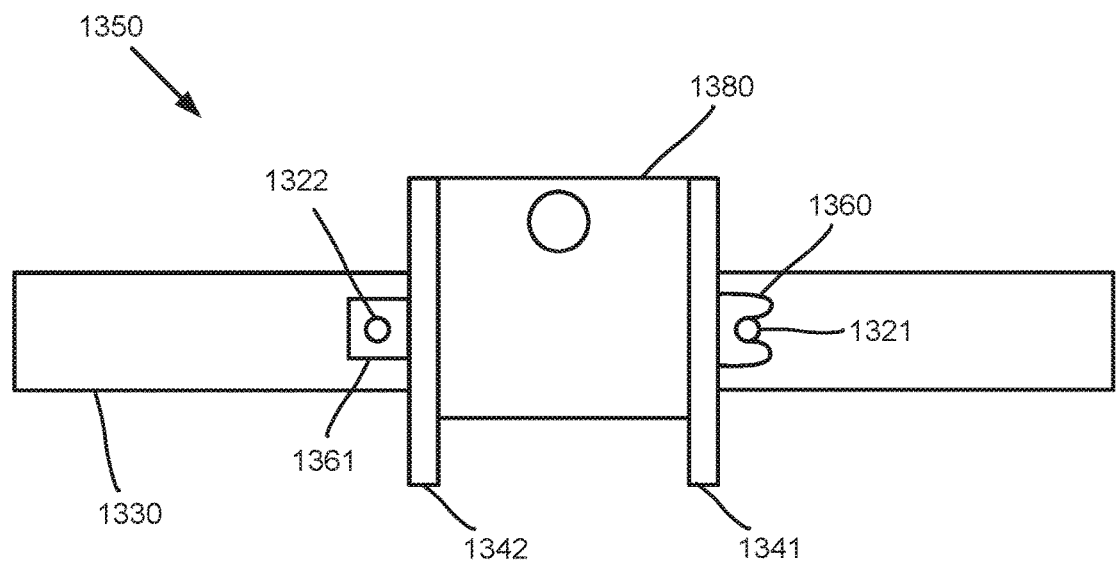
FIG. 14 illustrates a close up view of the example axle assembly of FIG. 13 with the axle located by one or more position devices.

FIG. 14 illustrates a close up view of the example axle assembly 1350 of FIG. 13 with the axle 1330 located by one or more position devices. The position devices may comprise a first axle mounting pin 1321 and a second axle mounting pin 1322. Axle mount frame 1380 may comprise a positional mounting structure 1360 configured to receive first axle mounting pin 1321. Additionally, axle mount frame 1380 may comprise one or more axle mounting structures, such as a first axle mounting structure 1361, configured to receive second axle mounting pin 1322. First and second axle mounting pins 1321, 1322 may project out from a surface of axle 1330 and pass at least partially pass through positional mounting structure 1360 and first axle mounting structure 1361, respectively.

Positional mounting structure 1360 may comprise a partial opening into which first axle mounting pin 1321 is located in order to position axle mount frame 1380 relative to axle 1330. First axle mounting structure 1361 may comprise a through hole into which second axle mounting pin 1322 may be located after positioning axle mount frame 1380 relative to the first axle mounting pin 1321. Positional mounting structure 1360 may be configured to account for any tolerance build up in axle mount frame 1380 relative to the location of first and second axle mounting pins 1321, 1322. For example, the partial opening of positional mounting structure 1360 may be configured to allow for positional adjustment of positional mounting structure 1360 relative to first axle mounting pin 1321 when assembling the axle mount frame 1380 to axle 1330.

Positional mounting structure 1360 may be welded or otherwise rigidly attached to a first trunnion plate 1341 of axle mount frame 1380. Additionally, first axle mounting structure 1361 may be welded or otherwise rigidly attached to a second trunnion plate 1342 of axle mount frame 1380. By locating positional mounting structure 1360 and first axle mounting structure 1361 at first and second axle mounting pins 1321, 1322, the position of axle mount frame 1380 may be substantially fixed with respect to axle 1330 both longitudinally and rotationally.

Figure 15:
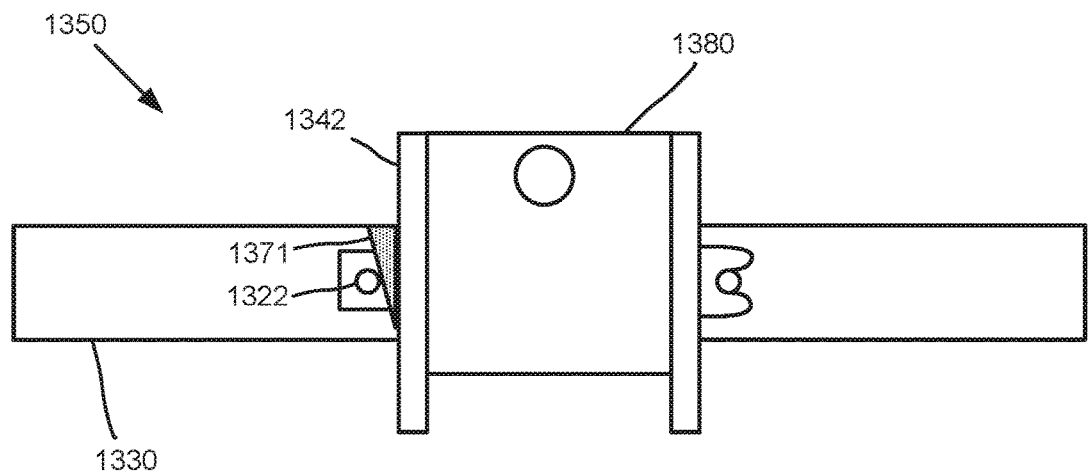
FIG. 15 illustrates the example axle assembly of FIG. 14 with an axle adjustment device located between a position device and the axle mount.

FIG. 15 illustrates the example axle assembly 1350 of FIG. 14 with an axle adjustment device, such as a wedge 1371, located between the second axle mounting pin 1322 and the second trunnion plate 1342 of the axle mount frame 1380. In some examples, wedge 1371 may be driven, pressed, pushed, or otherwise inserted into the space between the second axle mounting pin 1322 and the second trunnion plate 1342. Wedge 1371 may comprise an inclined surface that contacts second axle pin 1322. In the installed position, wedge 1371 may be configured to exert a substantially inward or compressive force against second trunnion plate 1342.

Figure 16:
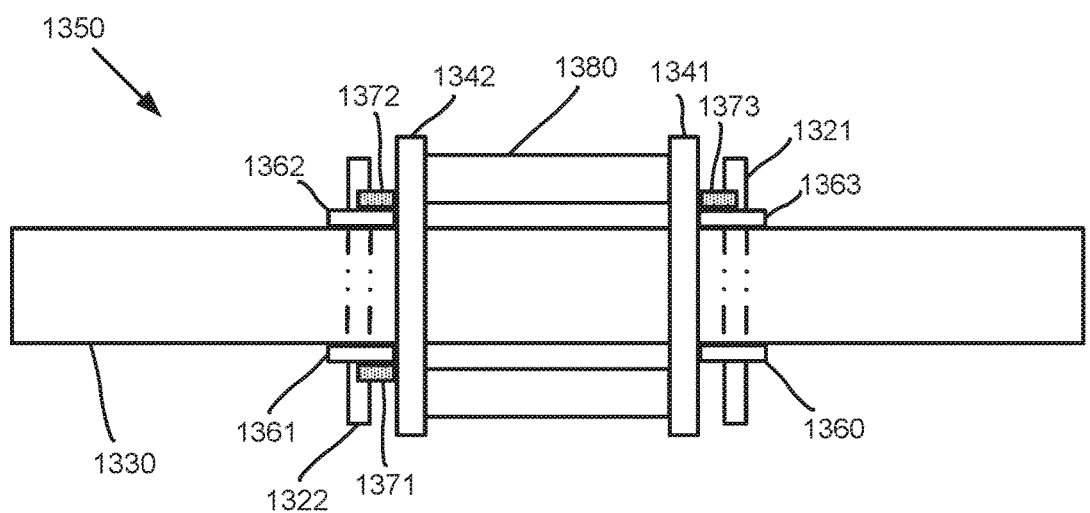
FIG. 16 illustrates a top view of the example axle assembly of FIG. 14 with a plurality of axle adjustment devices.

FIG. 16 illustrates a top view of the example axle assembly 1350 of FIG. 14 with a plurality of axle adjustment devices. The axle adjustment devices may comprise one or more wedges inserted between at least one of the position devices and the axle mount frame 1380. In some examples, one or both of first and second axle mounting pins 1321, 1322 may pass completely through axle 1330. In other examples, one or both of first and second axle mounting pins 1321, 1322 may comprise bosses that project from the outer surface of axle 1330.

First axle mounting structure 1361 may be located at or near a first end of second axle mounting pin 1322, and a second axle mounting structure 1362 may be located at or near a second end of second axle mounting pin 1322 on an opposite side of axle 1330. A second wedge 1372 may be inserted between the second axle mounting pin 1322 and the second trunnion plate 1342 of the axle mount frame 1380, similar to wedge 1371. The second wedge 1372 may be located adjacent second axle mounting structure 1362.

Positional mounting structure 1360 may be located at or near a first end of first axle mounting pin 1321, and a third axle mounting structure 1363 may be located at or near a second end of first axle mounting pin 1321 on an opposite side of axle 1330. A third wedge 1373 may be inserted between the first axle mounting pin 1321 and the first trunnion plate 1341 of the axle mount frame 1380. The third wedge 1373 may be located adjacent third axle mounting structure 1363.

One or both of second axle mounting structure 1362 and third axle mounting structure 1363 may be configured similarly as first axle mounting structure 1361, namely to include a through-hole. In other examples, one or both of second axle mounting structure 1362 and third axle mounting structure 1363 may be configured similarly as positional axle mounting structure 1360, namely to include a partial opening that may be configured to account for any tolerance build up between axle mount frame 1380 and the positions of first and second axle mounting pins 1321, 1322.

First wedge 1371 and second wedge 1372 may be welded or otherwise rigidly attached to second trunnion plate 1342 once the position of axle mount frame 1380 has been finally determined with respect to axle 1330. Similarly, third wedge 1373 may be welded or otherwise rigidly attached to first trunnion plate 1341. By positioning and affixing the wedges to axle mount frame 1380, the axial load placed on axle 1330 may be substantially evenly transferred to positional mounting structure 1360 and the three axle mounting structures 1361, 1362, 1363.

The positional adjustment of axle mount frame 1380 relative to axle 1330 may only need to be completed during an initial installation of axle assembly 1350. For example, the plurality of wedges may remain rigidly attached to the first and second trunnion plates 1341, 1342 during any subsequent assembly and/or disassembly of the axle assembly 1350.

When removing axle 1330 from axle mount frame 1380, one or both of first and second axle mounting pins 1321, 1322 may be at least partially removed or withdrawn from axle 1330. For example, with first axle mounting pin 1321 withdrawn from axle 1330, axle 1330 may be slid or otherwise moved longitudinally in order to disengage the second axle mounting pin 1322 from first axle mounting structure 1361 and from second axle mounting structure 1362. With the axle mounting structures disengaged from the axle mounting pins, axle 1330 may be disconnected and/or separated from axle mount frame 1380.

Figure 17A:
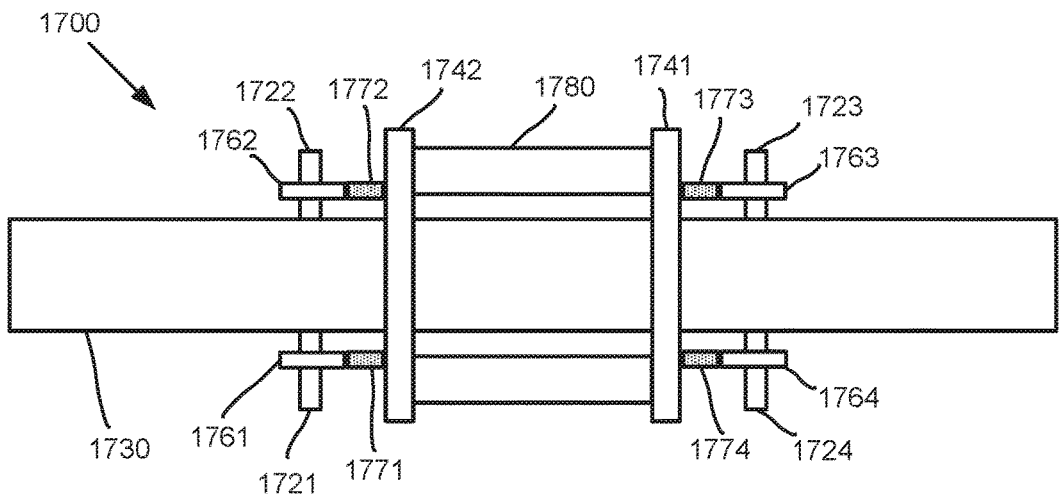
FIG. 17A illustrates a top view of an example axle assembly comprising one or more axle position adjustment devices.

FIG. 17A illustrates a top view of an example axle assembly 1700 comprising one or more axle position adjustment devices. An axle mount frame 1780 may be installed on an axle 1730. For example, axle mount frame 1780 may be slid onto the approximate center of axle 1730 during an assembly process.

One or more position devices may project from the surface of axle 1730. For example, a first position device 1721 may be located on an opposite side of axle 1730 as a second position device 1722. Both the first and second position devices 1721, 1722 may be located near one end of axle mount frame 1780. Similarly, a third position device 1723 and a fourth position device 1724 may project from the surface of axle 1730 near the other end of axle mount frame 1780. Axle mount frame 1780 may comprise a first trunnion plate 1741 and a second trunnion plate 1742.

One or more axle adjustment devices may be configured to adjust the position of the axle 1730 relative to axle mount frame 1780. For example, a first axle adjustment device 1771 may be inserted between first trunnion plate 1742 and first position device 1721. First position device 1721 may comprise an engagement apparatus 1761. Engagement apparatus 1761 may be configured to provide a bearing surface that contacts first axle adjustment device 1771. One or more additional engagement devices 1762, 1763, 1764 may similarly be configured to contact other axle adjustment devices.

The one or more axle adjustment devices 1771, 1772, 1773, 1774 may be configured to ensure that the axle 1730 is securely coupled to axle mount frame 1780 by applying an inward directing or compressive force against both ends of axle mount frame 1780. For example, third and fourth axle adjustment devices 1773, 1774 may be configured to exert an inward force against first trunnion plate 1741. Similarly, first and second axle adjustment devices 1771, 1772 may be configured to exert an inward force against second trunnion plate 1742.

Figure 17B:
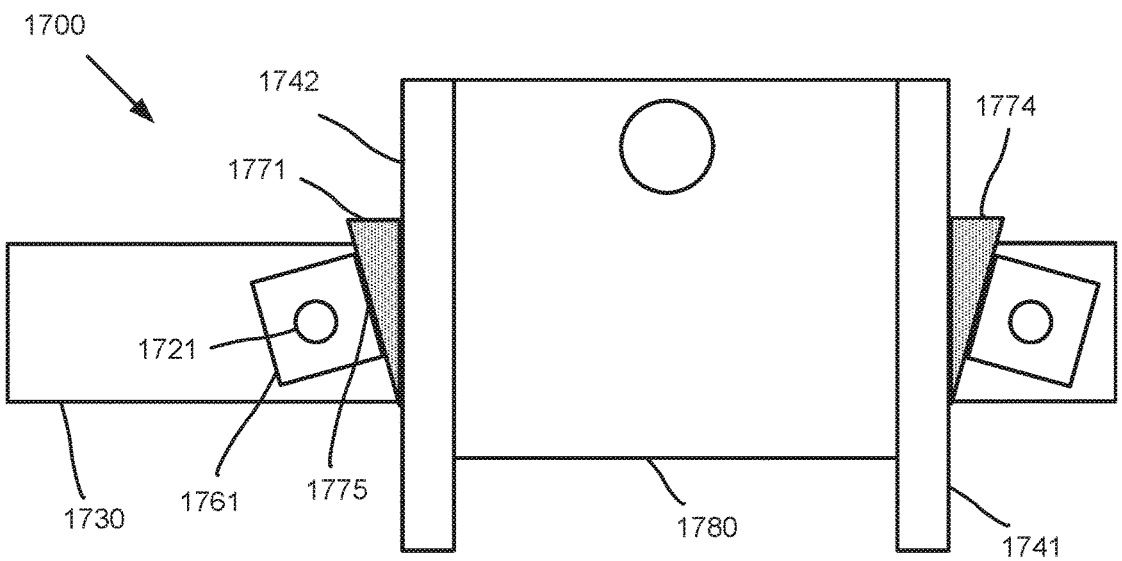
FIG. 17B illustrates an enlarged partial side view of the example axle assembly of FIG. 17A.

FIG. 17B illustrates an enlarged partial side view of the example axle assembly 1700 of FIG. 17A. One or more axle adjustment position assemblies, such as fourth axle adjustment device 1774, may be configured as a positional mounting structure to locate an initial position of the axle 1730 relative to the axle mount frame 1780. For example, fourth axle adjustment device 1774 may provide a bearing surface that presses up against the exterior surface of first trunnion plate 1741.

In some examples, first axle adjustment device 1771 may be inserted between the first position device 1721 and the second trunnion plate 1742 after the fourth axle adjustment device 1774 has already been positioned adjacent first trunnion plate 1741. The first engagement apparatus 1761 may be configured to rotate relative to first position device 1721. The rotation of first engagement apparatus 1761 may form a contact surface which is aligned with an inclined surface 1775 of first axle adjustment device 1771.

First axle adjustment device 1771 may be configured to press the axle mount frame 1780 against the fourth axle adjustment device 1774 when the first axle adjustment device 1771 is placed in contact with first position device 1721 via the first engagement device 1761. When the axle assembly 1700 is assembled, fourth axle adjustment device 1774 may be configured to prohibit relative movement between the axle 1730 and the axle mount frame 1780 in a first longitudinal directional along the rotational axis of the axle assembly 1700. Similarly, first axle adjustment device 1771 may be configured to prohibit relative movement between the axle 1730 and the axle mount frame 1780 in a second or opposite longitudinal directional.

Axle assembly 1700 may be configured to constrain the longitudinal and rotational position of the axle mount frame 1780 relative to the axle 1730 at the selected position. In some examples, one or more of the axle adjustment devices may be welded to the axle mount frame 1780 and/or to one or more of the position devices in the selected position.

Figure 18:
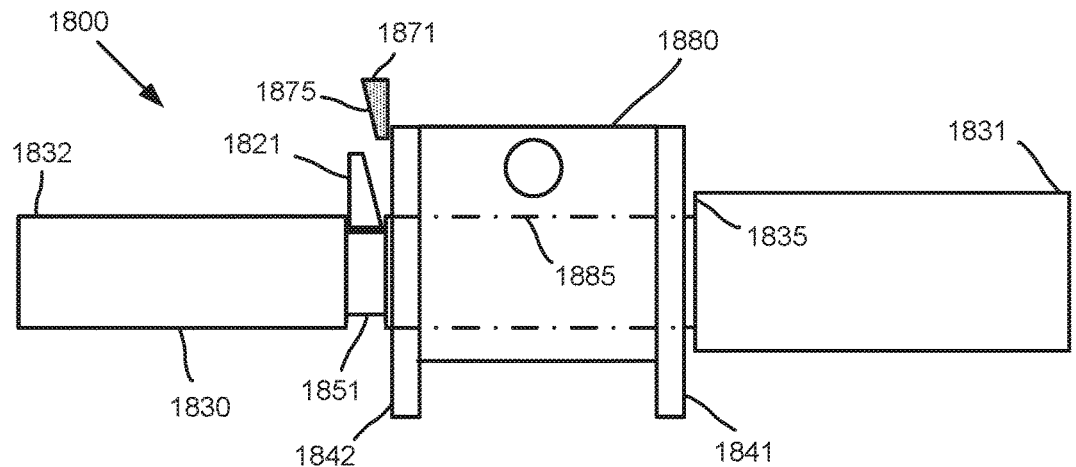
FIG. 18 illustrates another example axle assembly comprising one or more axle position adjustment devices.

FIG. 18 illustrates another example axle assembly 1800 comprising one or more axle position adjustment devices. An axle mount frame 1880 may be installed between a first end 1831 and a second end 1832 of an axle 1830. For example, axle mount frame 1880 may be slid over second end 1832 of axle 1830 during an assembly process. In other examples, axle 1830 may be configured to slide into a through-hole 1885 of axle mount frame 1880 during the assembly process. Axle assembly 1800 is shown in a partially assembled position, in which a first trunnion plate 1841 of axle mount frame 1880 is located near a positional mounting structure 1835 of axle 1830.

First end 1831 may comprise a larger diameter than second end 1832 of axle 1830 and, in some examples, positional mounting structure 1835 may be formed at the intersection of the two different diameters. Additionally, a diameter associated with the through-hole 1885 of axle mount frame 1880 may be sized intermediate the diameters of first and second end 1831, 1832, so that axle mount frame 1880 may be configured to slide over second end 1832, but be too small to slide over first end 1831. In some examples, positional mounting structure 1835 may comprise a bearing surface that is substantially perpendicular to the length of the axle 1830.

Positional mounting structure 1835 may be configured to locate an initial position of the axle 1830 relative to the axle mount frame 1880. Additionally, positional mounting structure 1835 may be configured to provide a bearing surface that contacts first trunnion plate 1841. One or more position devices may project from the surface of axle 1830. For example, a position device 1821 may be located on opposite side of axle mount frame 1880 as positional mounting structure 1835.

Position device 1821 may be inserted into a groove 1851 formed in axle 1830. In some examples groove 1851 may be formed around the circumference of axle 1830. Position device 1821 may comprise a ring or a partial ring such as a c-clamp that fits within groove 1851. Axle mount frame 1880 may be configured to be located at the approximate center of axle 1880, such that first trunnion plate 1841 is located next to positional mounting structure 1835 and second trunnion plate 1841 is located next to position device 1821.

One or more axle adjustment devices, such as axle adjustment device 1871, may be inserted between position device 1821 and the second trunnion plate 1842 after first trunnion plate 1841 has been placed in contact with positional mounting structure 1835. Axle adjustment device 1871 may comprise an inclined surface 1875 configured to contact the position device 1821. The angle of inclined surface 1871 may align with the angle of the bearing surface of position device 1821. Axle adjustment device 1871 may be configured to exert a compressive force against or between the axle mount frame 1880 and the positional mounting structure 1835 when the axle adjustment device 1871 is placed in contact with the position device 1821.

Axle adjustment device 1871 may be configured to ensure that the axle 1830 is securely coupled to axle mount frame 1880 by applying an inward directing force against both ends of axle mount frame 1880. For example, positional mounting structure 1835 may be configured to exert an inward force against first trunnion plate 1841. Similarly, position device 1821 and/or axle adjustment device 1871 may be configured to exert an inward force against second trunnion plate 1842.

When the axle assembly 1800 is assembled, position device 1821 and positional mounting structure 1835 may be configured to prohibit relative movement between the axle 1830 and the axle mount frame 1880. For example, axle assembly 1800 may be configured to constrain the longitudinal position of the axle mount frame 1880 relative to the axle 1830 at the selected position. In some examples, axle adjustment device 1871 may be welded to the axle mount frame 1880 and/or to position device 1821 in the selected position.

Figure 19:
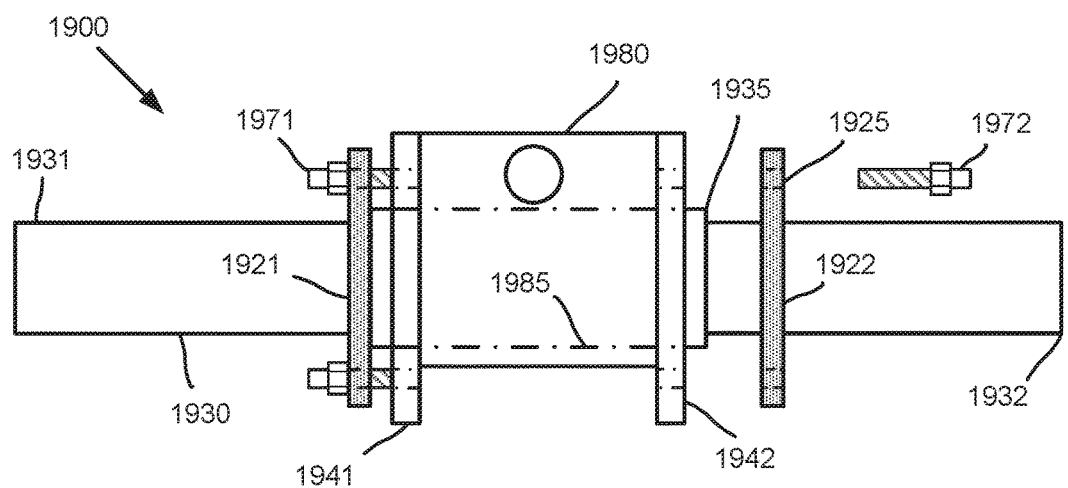
FIG. 19 illustrates yet another example axle assembly comprising one or more axle position adjustment devices.

FIG. 19 illustrates yet another example axle assembly 1900 comprising one or more axle position adjustment devices. An axle mount frame 1980 may be installed between a first end 1931 and a second end 1932 of an axle 1930. First end 1931 and second end 1932 of axle 1930 may be associated with the same axle diameter. A central diameter 1985 of axle 1930 may be larger than the diameters of first and second ends 1931, 1932.

Axle assembly 1900 is shown in a partially assembled configuration, in which a first trunnion plate 1941 is attached to a first position device 1921 on one side of axle mount frame 1980, and a second position device 1922 is being moved into position on an opposite side of axle mount frame 1980. First position device 1921 may comprise a plate or a ring that is attached to first trunnion plate 1941 by one or more axle adjustment devices 1971. In some examples, axle adjustment device 1971 may comprise a bolt or some other type of securing device that is configured to adjust the distance or position of axle mount frame 1980 relative to first position device 1921. First position device 1921 may be slid over first end 1931 of axle 1930.

A positional mounting structure 1935 may be formed by the transition between central diameter 1985 and the smaller diameter of either end 1931, 1932 of axle 1930. Positional mounting structure 1935 may be configured to locate an initial position of the axle 1930 relative to the axle mount frame 1980. Additionally, positional mounting structure 1935 may be configured to provide a bearing surface against first position device 1921 and second position device 1921.

One or more axle adjustment devices, such as second axle adjustment device 1972, may be configured to operably couple second position device 1922 and second trunnion plate 1942 after first position device 1921 has been coupled to first trunnion plate 1941. Second axle adjustment device 1972 may be configured to pass through a mounting hole 1925 of second position device 1922 and into second trunnion plate 1942. Second axle adjustment device 1972 may be configured to exert a compressive force against or between the axle mount frame 1980 and the positional mounting structure 1935 when the second axle adjustment device 1972 is tightened and/or secured to second position device 1922.

First and second position devices 1921, 1922 may be configured to ensure that the axle 1930 is securely coupled to axle mount frame 1980 by applying an inward directing force against both ends of axle mount frame 1980. When the axle assembly 1900 is assembled, first and second position devices 1921, 1922 may be configured to prohibit relative movement between the axle 1930 and the axle mount frame 1980.

Figure 20:
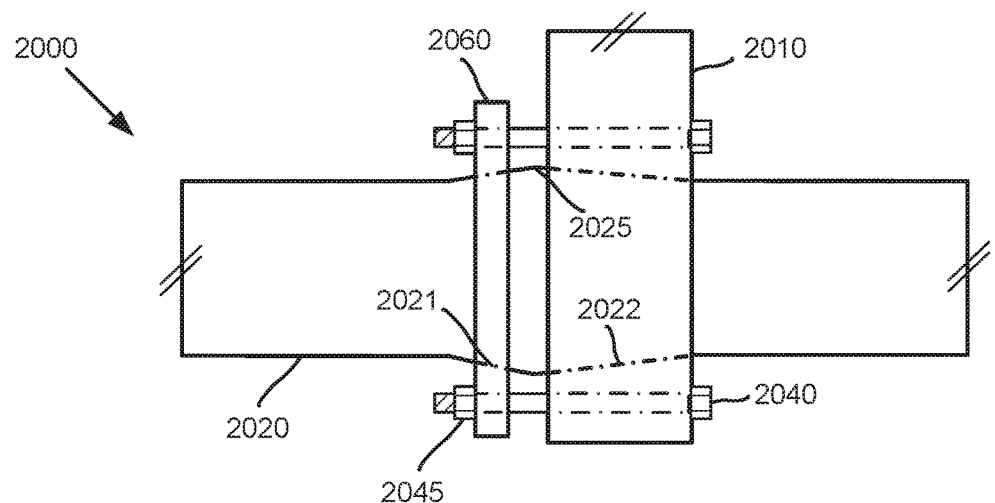
FIG. 20 illustrates an example axle assembly comprising a removable axle.

FIG. 20 illustrates an example axle assembly 2000 comprising an axle 2020 configured to be removably attached to an axle mount 2010. Axle mount 2010 may be connected to a load bearing frame or platform. The axle 2020 may comprise two non-horizontal tapered surfaces, illustrated as a first tapered surface 2021 and a second tapered surface 2022. First tapered surface 2021 may gradually increase in diameter from the main body of axle 2020 to a raised portion 2025. Second tapered surface 2022 may also gradually decrease in diameter from the main body of axle 2020 to the raised portion 2025. In some examples, the amount of increase in diameter, or slope, may vary as between first tapered surface 2021 and second tapered surface 2022. The raised portion 2025 may form a ridge and/or be associated with a maximum diameter of axle 2020.

First tapered surface 2021 may be configured to contact a clamping device 2060. Clamping device 2060 may be configured as a disc, a ring, a washer, or a plate which at least partially surrounds axle 2020. Additionally, one or more fasteners 2040, such as a bolt, a clamp, a nut, a screw fitting, a pin, a clip, other types of fastening and/or attachment devices, or any combination thereof, may be configured to rigidly fasten axle 2020 to axle mount 2010. For example, clamping device 2060 may be configured to draw axle mount 2010 into direct contact with the second tapered surface 2022 of axle 2020, as fasteners 2040 are tightened and/or otherwise secured. Second tapered surface 2022 may be configured to contact a correspondingly angled inner surface or through-hole of axle mount 2010.

Fasteners 2040 are illustrated as passing through or into both clamping device 2060 and axle mount 2010. One or more nuts 2045 or other types of tensioning devices may be configured to adjust the tension provided by fasteners 2040 as the nuts 2045 are tightened or loosened. Fasteners 2040 may be configured to provide a compression force between axle mount 2010 and clamping device 2060. In some examples, axle mount 2010 may comprise a load support frame, a lift cylinder, an axle linkage, other types of support structures, or any combination thereof.

Figure 21:
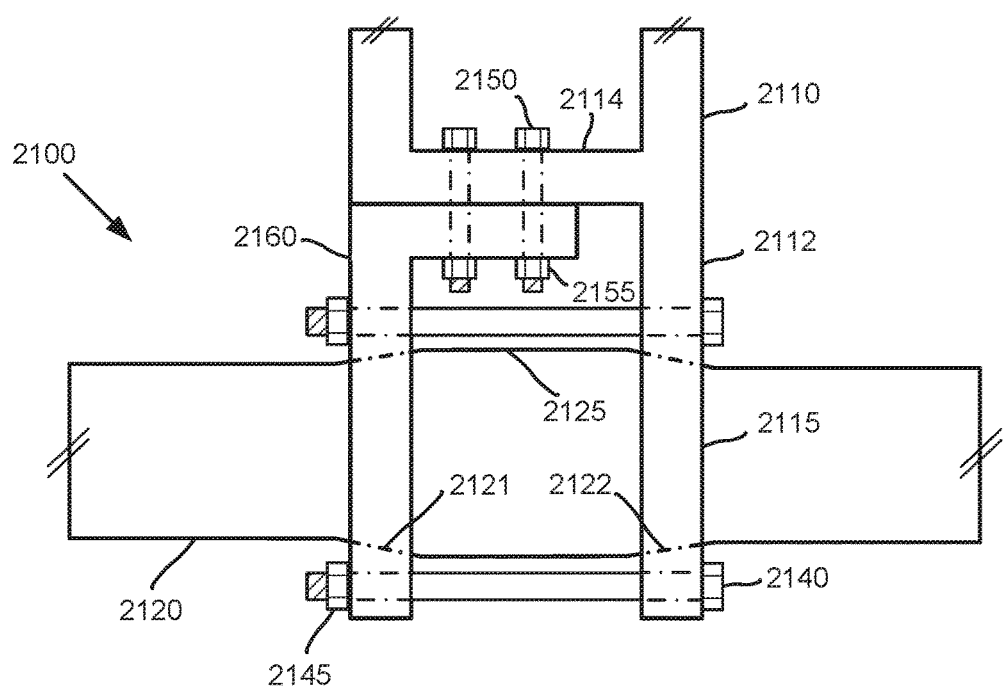
FIG. 21 illustrates a further example axle assembly comprising a removable axle.

FIG. 21 illustrates a further example axle assembly 2100 comprising an axle 2120 configured to be removably attached to an axle mount 2110. Axle mount 2110 may comprise a substantially vertical support plate 2112 and a substantially horizontal cross-brace 2114. A through-hole 2115 may be formed in the support plate 2112 into which the axle 2120 may be inserted. In some examples, the through-hole 2115 may be substantially conical in shape.

The axle 2120 may comprise two tapered surfaces, illustrated as a first tapered surface 2121 and a second tapered surface 2122. First tapered surface 2121 may gradually increase in diameter from the main body of axle 2120 to a raised portion 2125. Second tapered surface 2122 may also gradually decrease in diameter from the raised portion 2125 to the main body of axle 2120. In some examples, the amount of increase in diameter, the angle of incline, and/or the slope, may vary as between first tapered surface 2121 and second tapered surface 2122. In other examples, the slopes may be the same but oppositely oriented. The raised portion 2125 may form a ridge and/or be associated with a maximum diameter of axle 2120.

First tapered surface 2121 may be configured to contact a clamping device 2160. Clamping device 2160 may be configured as a disc, a ring, a washer, or a plate which at least partially surrounds axle 2120. Additionally, a first set of fasteners 2140, such as a bolt, a clamp, a nut, a screw fitting, a pin, a clip, other types of fastening and/or attachment devices, or any combination thereof, may be configured to rigidly fasten axle 2120 to axle mount 2110. For example, clamping device 2160 may be configured to draw axle mount 2110 into direct contact with the second tapered surface 2122 of axle 2120, as fasteners 2140 are tightened and/or otherwise secured. Second tapered surface 2122 may be configured to contact a correspondingly angled inner surface of through-hole 2115.

The first set of fasteners 2140 are illustrated as passing through or into both clamping device 2160 and axle mount 2110. One or more nuts 2145 or other types of tensioning devices may be configured to adjust the tension provided by the first set of fasteners 2140 as the nuts 2145 are tightened or loosened. The first set of fasteners 2140 may be configured to provide a compression force between axle mount 2110 and clamping device 2160.

A second set of fasteners 2150 may be configured to attach clamping device 2160 to axle mount 2110. For example, the second set of fasteners 2150 may pass through or into both clamping device 2160 and cross-brace 2114. Additionally, one or more nuts 2155 or other types of tensioning devices may be configured to adjust the tension provided by the second set of fasteners 2150 as the nuts 2155 are tightened or loosened.

In some examples, axle assembly 2100 may be assembled by sliding axle 2120 into the through-hole 2115 until the second tapered surface 2122 is in contact with support plate 2112. Similarly, clamping device 2160 may be positioned relative to the axle 2120 to contact the first tapered surface 2122. With axle mount 2110 and clamping device 2160 in position relative to axle 2120, the first set of fasteners 2140 and/or the second set of fasteners 2150 may be used to rigidly connect the axle 2120 to the axle mount 2110.

Figure 22:
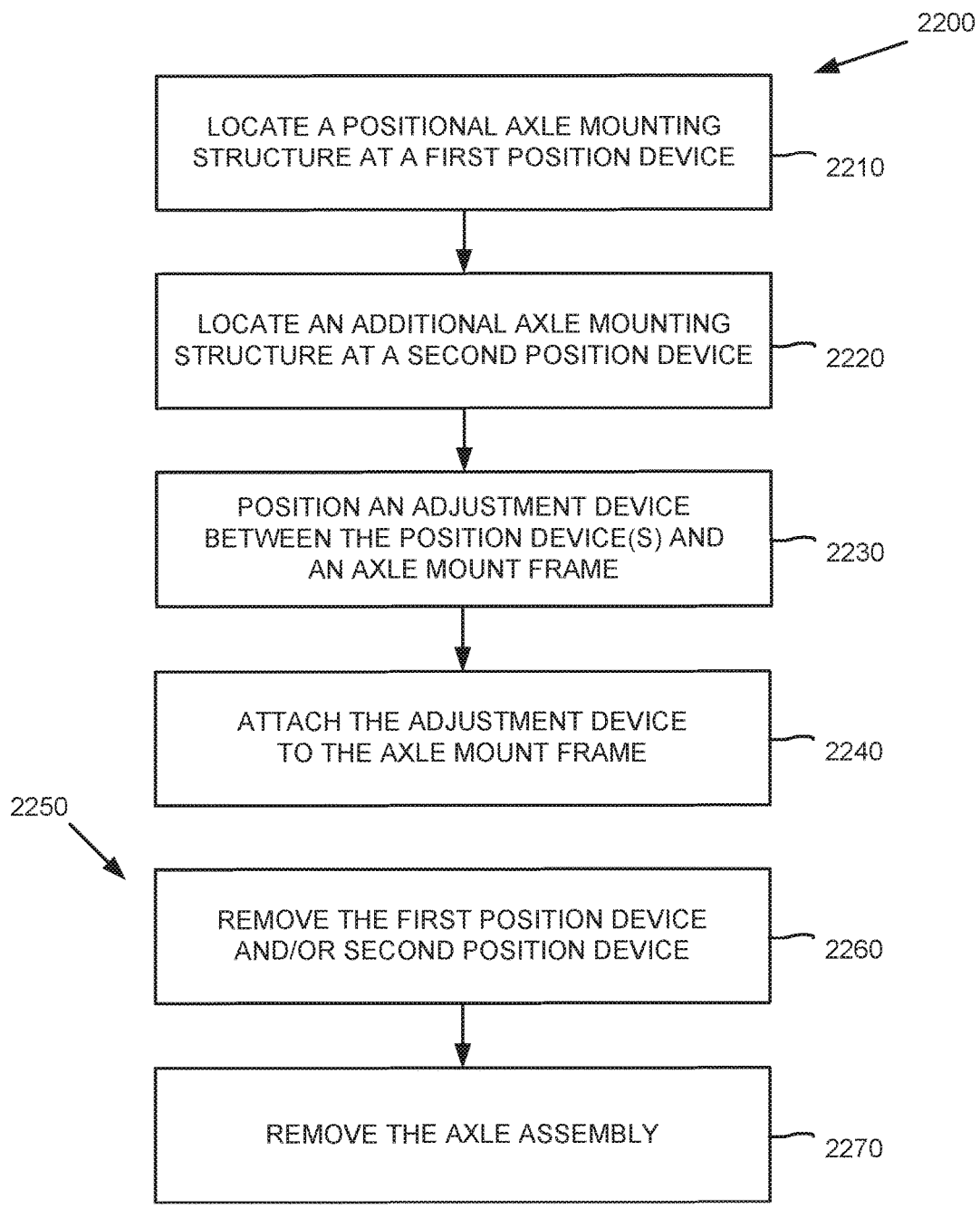
FIG. 22 illustrates an example process associated with removably attaching an axle assembly and an example process for removing the axle assembly.

FIG. 22 illustrates an example process 2200 associated with removably attaching an axle assembly and an example process 2250 for removing the axle assembly.

At operation 2210, a positional axle mounting structure may be located at a first position device of the axle. The first position device may comprise a first pin. The positional axle mounting structure may comprise a plate with a through hole sized to fit around the first pin with nominal clearance. The first pin may pass through the axle, such that first and second ends of the first pin project out of opposite sides of the axle.

At operation 2220, one or more additional axle mounting structures may be located at a second position device of the axle. The one or more additional axle mounting structures may comprise partial or oversized openings that may be configured to compensate for or otherwise accommodate any tolerance build up in the axle assembly.

At operation 2230, one or more adjustment devices may be positioned between the position devices and an axle mount frame. In some examples, three adjustment devices, such as wedges, may be positioned adjacent three position devices.

At operation 2240, the adjustment device may be attached to the axle mount frame. The axle mount frame may comprise one or more trunnion plates, and the adjustment device may be welded to the trunnion plate. The axle mount frame may be operably coupled to a load bearing frame or platform.

At operation 2260 of removal process 2250, one or both of the first and second position devices may be at least partially removed from the axle.

At operation 2270, with the first and/or second position devices having been at least partially removed, the axle may be removed from the axle mount frame.

Example Embodiments

A removable axle assembly for transporting a load bearing frame may comprise an axle, an axle mounting structure operably coupled to the axle and configured to be removably attached to an axle mount, a clamping structure, and one or more fastening devices attached to the clamping structure. The axle mounting structure may comprise an inner surface that aligns with a non-vertical tapered surface of the axle mount. In response to securing the one or more fastening devices, the clamping structure may be configured to exert a compression force that maintains contact between the tapered surface of the axle mount and the inner surface of the axle mounting structure.

The axle mount may comprise a lift assembly including a cylinder rod configured to lift the load bearing frame from a lowered position to a raised position, and the tapered surface may be provided at a lower end of the cylinder rod. The axle mounting structure may comprise a plate, and the lower end of the cylinder rod may be seated in a through-hole of the plate. The inner surface of the through-hole may be aligned with the tapered surface of the lower end of the cylinder rod.

In some examples, the clamping structure may be located beneath the axle mounting structure, and the compression force exerted by the clamping structure additionally maintains contact between the axle mounting structure and the clamping structure. Additionally, the one or more fastening devices may comprise one or more bolts that screw into the lower end of the cylinder rod. In response to loosening the one or more fastening devices, the axle assembly may be configured to be detached from the axle mount.

In other examples, the clamping structure may comprise a plate located above the axle mounting structure, and a through-hole of the plate may be configured to provide a seat for the cylinder rod. The inner surface of the through-hole may be aligned with a second tapered surface of the cylinder rod. The second tapered surface of the cylinder rod may be located above the tapered surface provided at the lower end of the cylinder rod. A raised portion may be formed on the cylinder rod intermediate the second tapered portion and the tapered surface provided at the lower end of the cylinder rod. The one or more fastening devices may comprise one or more bolts that couple the axle mounting structure to the plate.

The axle mounting structure may comprise an adjustable mounting structure that is configured to vary a position of the inner surface to accommodate axle mounts having different tapered surfaces. The adjustable mounting structure may comprise a pivot that is configured to vary the angle of the inner surface. The removable axle assembly may further comprise an adjustment device that is configured to vary a distance between two adjustable mounting structures having inner surfaces that face each other. The clamping structure may comprise a plate located above the axle mounting structure, and a through-hole of the plate may be configured to provide a seat for the axle mount, and wherein the inner surface of the through-hole is aligned with a second tapered surface of the axle mount.

A removable axle assembly may comprise an axle and an axle mounting structure operably coupled to the axle and configured to be removably attached to an axle mount. The axle mounting structure may comprise an inner surface that is aligned with a non-vertical tapered surface of the axle mount. Additionally, the removable axle assembly may comprise means for securing the tapered surface of the axle mount to the inner surface of the axle mounting structure and means for exerting a compression force to maintain contact between the tapered surface of the axle mount and the inner surface of the axle mounting structure. The axle mount may comprise a cylinder rod associated with a hydraulic lift cylinder, and wherein the tapered surface comprises a tapered lower end of the cylinder rod.

A method for removably attaching an axle assembly to an axle mount associated with a load bearing frame may comprise positioning a lower end of the axle mount within an axle mounting structure. The axle mounting structure may comprise an inner surface that is aligned with a non-vertical tapered surface of the axle mount. Additionally, the method may comprise securing one or more fastening devices attached to a clamping structure and exerting, by the clamping structure, a compression force to maintain contact between the tapered surface of the axle mount and the inner surface of the axle mounting structure. The compression force may result from securing the one or more fastening devices.

The axle mount may comprise a cylinder rod associated with a hydraulic lift cylinder, and the clamping structure may be positioned beneath the cylinder rod. Securing the one or more fastening devices may comprise mounting a plurality of bolts to a bottom surface of the cylinder rod. Additionally, the plurality of bolts may pass through the clamping structure and into the bottom surface of the cylinder rod. In some examples, the clamping structure may comprise a plate located above the axle mounting structure. A through-hole of the plate may be configured to provide a seat for the axle mount, and securing the one or more fastening devices may comprise coupling the metal plate to the axle mounting structure with a plurality of bolt.

An axle assembly may comprise an axle, an axle mount configured to be attached to the axle, a positional locater that projects from an outer surface of the axle and is configured to locate an initial position of the axle relative to the axle mount, and an axle adjustment device comprising an inclined surface that contacts the positional locater. A compressive force may be exerted between the axle mount and the axle adjustment device when the axle adjustment device is placed in contact with the positional locater to maintain the initial position of the axle.

The axle adjustment device may comprise a wedged shaped device. The positional locater may comprise a mounting pin attached to the axle, and the wedge shaped device may be placed in contact with both the mounting pin and the axle mount. In some examples, the positional locater may comprise an engagement device having a substantially planar bearing surface that contacts the inclined surface of the axle adjustment device, and wherein the wedge shaped device is placed in contact with both the engagement device and the axle mount.

The engagement device may be rotationally coupled to a mounting pin that projects from the outer surface of the axle, and a rotational position of the engagement device relative to the mounting pin may be adjusted to align the substantially planar bearing surface with the inclined surface of the axle adjustment device. In some examples, the engagement device may be at least partially located within a groove formed in the outer surface of the axle, and the groove may be configured to inhibit a longitudinal movement of the engagement device with respect to the axle.

The positional locater may comprise a non-vertical tapered portion of the axle that increases in diameter from the outer surface of the axle to a raised portion of the axle, and the tapered portion of the axle may create a bearing surface that contacts the inclined surface of the axle adjustment device. The axle assembly may further comprise a second bearing surface located on an opposite side of the raised portion of the axle as the non-vertical tapered portion, and the second bearing surface may contact a surface of the axle mount. The second bearing surface may comprise a non-vertical tapered portion of the axle, and the second bearing surface may contact a substantially conical shaped inner surface of the axle mount. The substantially conical shaped inner surface may comprise a through-hole into which the axle is removably inserted. In some examples, angles of incline associated with the second bearing surface and the bearing surface that contacts the inclined surface of the axle adjustment device may be different from each other.

The axle adjustment device may comprise a clamping device, and the clamping device may be bolted to the axle mount. The clamping device may be bolted to the axle mount by a first set of bolts oriented in a generally horizontal orientation and by a second set of bolts oriented in a generally vertical orientation.

An axle assembly may comprise an axle comprising a tapered surface and a non-horizontal bearing surface, and an axle mount operably coupled to the axle. The axle mount may comprise a contact surface that is aligned with the bearing surface of the axle. Additionally, the axle assembly may comprise an axle adjustment device comprising an inclined surface that contacts the tapered surface of the axle, means for coupling the axle adjustment device to the axle mount to longitudinally position the axle mount relative to the axle, and means for exerting a compression force between the contact surface of the axle mount and the bearing surface of the axle.

The non-horizontal bearing surface may comprise a second tapered surface of the axle, and the axle mount may comprise a through-hole having an inner surface which is substantially conical in shape to receive the second tapered surface of the axle. In some examples, the bearing surface may be substantially perpendicular to the axle.

A method for removably attaching an axle assembly to an axle mount may comprise locating a positional axle mounting structure at a first positional locator that projects from an outer surface of the axle, locating an additional axle mounting structure at a second positional locator that projects from the outer surface of the axle, positioning an adjustment device between the positional axle mounting structure and the axle mount, and attaching the adjustment device to the axle mount.

The first positional locator may comprise a first pin, and the positional axle mounting structure may comprise a plate with a through-hole sized to fit around the first pin. The adjustment device may comprise a wedge shaped device having a bearing surface, and positioning the adjustment device may comprise aligning the bearing surface to a contact surface of the positional axle mounting structure. The method may further comprise rigidly fixing a position of the adjustment device relative to the positional axle mounting structure after the bearing surface is aligned with the contact surface.

Having described and illustrated various examples herein, it should be apparent that other examples may be modified in arrangement and detail. We claim all modifications and variations coming within the spirit and scope of the following claims.

The invention claimed is:

1. A removable axle assembly for transporting a load bearing frame, comprising:
   an axle;
   an axle mounting structure operably coupled to the axle and configured to be removably attached to an axle mount, wherein the axle mounting structure comprises an inner surface that aligns with a non-vertical tapered surface of the axle mount;
   a clamping structure; and
   one or more fastening devices attached to the clamping structure, wherein in response to securing the one or more fastening devices, the clamping structure is configured to exert a compression force that maintains contact between the tapered surface of the axle mount and the inner surface of the axle mounting structure, wherein the axle mount is configured to lift the load bearing frame between a lowered position to a raised position and wherein the tapered surface is provided on a lower end of the axle mount.

2. A removable axle assembly for transporting a load bearing frame, comprising:
   an axle;
   an axle mounting structure operably coupled to the axle and configured to be removably attached to an axle mount, wherein the axle mounting structure comprises an inner surface that aligns with a non-vertical tapered surface of the axle mount;
   a clamping structure; and
   one or more fastening devices attached to the clamping structure, wherein in response to securing the one or more fastening devices, the clamping structure is configured to exert a compression force that maintains contact between the tapered surface of the axle mount and the inner surface of the axle mounting structure, wherein the axle mount comprises a lift assembly including a cylinder rod configured to lift the load bearing frame from a lowered position to a raised position, and wherein the tapered surface is provided at a lower end of the cylinder rod.

3. The removable axle assembly of claim 2, wherein the axle mounting structure comprises a plate, wherein the lower end of the cylinder rod is seated in a through-hole of the plate, and wherein the inner surface of the through-hole is aligned with the tapered surface of the lower end of the cylinder rod.

4. The removable axle assembly of claim 2, wherein the clamping structure is located beneath the axle mounting structure, and wherein the compression force exerted by the clamping structure additionally maintains contact between the axle mounting structure and the clamping structure.

5. The removable axle assembly of claim 4, wherein the one or more fastening devices comprise one or more bolts that screw into the lower end of the cylinder rod.

6. The removable axle assembly of claim 2, wherein the clamping structure comprises a plate located above the axle mounting structure, wherein a through-hole of the plate is configured to provide a seat for the cylinder rod, and wherein the inner surface of the through-hole is aligned with a second tapered surface of the cylinder rod.

7. The removable axle assembly of claim 6, wherein the second tapered surface of the cylinder rod is located above the tapered surface provided at the lower end of the cylinder rod.

8. The removable axle assembly of claim 7, wherein a raised portion is formed on the cylinder rod intermediate the second tapered portion and the tapered surface provided at the lower end of the cylinder rod.

9. The removable axle assembly of claim 6, wherein the one or more fastening devices comprise one or more bolts that couple the axle mounting structure to the plate.

10. The removable axle assembly of claim 1, wherein in response to loosening the one or more fastening devices, the axle assembly is configured to be detached from the axle mount.

11. A removable axle assembly for transporting a load bearing frame, comprising:
    an axle:
    an axle mounting structure operably coupled to the axle and configured to be removably attached to an axle mount, wherein the axle mounting structure comprises an inner surface that aligns with a non-vertical tapered surface of the axle mount;
    a clamping structure; and
    one or more fastening devices attached to the clamping structure, wherein in response to securing the one or more fastening devices, the clamping structure is configured to exert a compression force that maintains contact between the tapered surface of the axle mount and the inner surface of the axle mounting structure, wherein the axle mounting structure comprises an adjustable mounting structure that is configured to vary a position of the inner surface to accommodate axle mounts having different tapered surfaces.

12. The removable axle assembly of claim 11, wherein the adjustable mounting structure comprises a pivot that is configured to vary the angle of the inner surface.

13. The removable axle assembly of claim 11, further comprising an adjustment device that is configured to vary a distance between two adjustable mounting structures having inner surfaces that face each other.

14. The removable axle assembly of claim 11, wherein the clamping structure comprises a plate located above the axle mounting structure, wherein a through-hole of the plate is configured to provide a seat for the axle mount, and wherein the inner surface of the through-hole is aligned with a second tapered surface of the axle mount.

15. A removable axle assembly comprising:
an axle;
an axle mounting structure operably coupled to the axle and configured to be removably attached to an axle mount, wherein the axle mounting structure comprises an inner surface that is aligned with a non-vertical tapered surface of the axle mount;
a clamp for securing the tapered surface of the axle mount to the inner surface of the axle mounting structure; and
a fastener for exerting a compression force to maintain contact between the tapered surface of the axle mount and the inner surface of the axle mounting structure, wherein the axle mount is configured to lift the load bearing frame between a lowered position and a raised position and wherein the tapered surface is provided on a lower end of the axle mount.

16. A removable axle assembly comprising:
an axle;
an axle mounting structure operably coupled to the axle and configured to be removably attached to an axle mount, wherein the axle mounting structure comprises an inner surface that is aligned with a non-vertical tapered surface of the axle mount;
a clamp for securing the tapered surface of the axle mount to the inner surface of the axle mounting structure; and
a fastener for exerting a compression force to maintain contact between the tapered surface of the axle mount and the inner surface of the axle mounting structure, wherein the axle mount comprises a cylinder rod associated with a hydraulic lift cylinder, and wherein the tapered surface comprises a tapered lower end of the cylinder rod.

17. A method for removably attaching an axle assembly to an axle mount coupled at a top end to a load bearing frame, the method comprising:
positioning a lower end of the axle mount extending vertically down beneath the top end within an axle mounting structure, wherein the axle mounting structure comprises an inner surface that is aligned with a non-vertical tapered surface formed on the lower end of the axle mount;
securing one or more fastening devices attached to a clamping structure; and
exerting, by the clamping structure, a compression force to maintain contact between the tapered surface of the axle mount and the inner surface of the axle mounting structure, wherein the compression force results from securing the one or more fastening devices.

18. A method for removably attaching an axle assembly to an axle mount associated with a load bearing frame, the method comprising:
positioning a lower end of the axle mount within an axle mounting structure, wherein the axle mounting structure comprises an inner surface that is aligned with a non-vertical tapered surface of the axle mount;
securing one or more fastening devices attached to a clamping structure; and
exerting, by the clamping structure, a compression force to maintain contact between the tapered surface of the axle mount and the inner surface of the axle mounting structure, wherein the compression force results from securing the one or more fastening devices, wherein the axle mount comprises a cylinder rod associated with a hydraulic lift cylinder, wherein the clamping structure is positioned beneath the cylinder rod, and wherein securing the one or more fastening devices comprises mounting a plurality of bolts to a bottom surface of the cylinder rod.

19. The method of claim 18, wherein the plurality of bolts pass through the clamping structure and into the bottom surface of the cylinder rod.

20. The method of claim 17, wherein the clamping structure comprises a plate located above the axle mounting structure, wherein a through-hole of the plate is configured to provide a seat for the axle mount, and wherein securing the one or more fastening devices comprises coupling the metal plate to the axle mounting structure with a plurality of bolts.

* * * * *